(12) United States Patent
Hao et al.

(10) Patent No.: US 10,773,490 B2
(45) Date of Patent: Sep. 15, 2020

(54) SURFACE-MODIFIED ADHESIVES

(75) Inventors: Encai Hao, Woodbury, MN (US);
Audrey A. Sherman, St. Paul, MN (US); Kevin R. Schaffer, Woodbury, MN (US); Daniel W. Hennen, Cottage Grove, MN (US); John P. Baetzold, North St. Paul, MN (US); Mark J. Pellerite, Woodbury, MN (US); Mikhail L. Pekurovsky, Bloomington, MN (US); Kanta Kumar, Woodbury, MN (US); Michael L. Steiner, New Richmond, WI (US); John J. Stradinger, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 896 days.

(21) Appl. No.: 13/510,504

(22) PCT Filed: Nov. 18, 2010

(86) PCT No.: PCT/US2010/057176
§ 371 (c)(1),
(2), (4) Date: May 17, 2012

(87) PCT Pub. No.: WO2011/063089
PCT Pub. Date: May 26, 2011

(65) Prior Publication Data
US 2013/0004749 A1     Jan. 3, 2013

Related U.S. Application Data

(60) Provisional application No. 61/623,114, filed on Nov. 20, 2009.

(51) Int. Cl.
*C09J 7/00* (2018.01)
*B32B 37/30* (2006.01)
(Continued)

(52) U.S. Cl.
CPC ............... *B32B 7/10* (2013.01); *B32B 3/085* (2013.01); *B32B 7/06* (2013.01); *B32B 7/12* (2013.01);
(Continued)

(58) Field of Classification Search
CPC ...................................................... B32B 7/10
See application file for complete search history.

(56) References Cited

U.S. PATENT DOCUMENTS 3,340,086 A    9/1967  Groak
4,556,595 A  * 12/1985  Ochi ........................ C09J 7/10
                                                               428/143
(Continued)

FOREIGN PATENT DOCUMENTS

WO    WO 2007-022226    2/2007

*Primary Examiner* — Ian A Rummel
(74) *Attorney, Agent, or Firm* — Jeffrey M. Olofson

(57) ABSTRACT

Surface-modified adhesives may be prepared by contacting an adhesive layer to an at least partially discontinuous layer on a releasing substrate and removing the adhesive layer such that at least a portion of the at least partially discontinuous layer adheres to the adhesive surface. The modified adhesive surface remains an adhesive surface. The modified adhesive layer can be used to prepare adhesive articles, including articles containing multiple surface-modified adhesive layers.

4 Claims, 2 Drawing Sheets

(51) Int. Cl.

| | | |
|---|---|---|
| *B05D 5/12* | (2006.01) | |
| *B05D 5/10* | (2006.01) | |
| *B32B 7/12* | (2006.01) | |
| *B05D 5/00* | (2006.01) | |
| *B82Y 30/00* | (2011.01) | |
| *B32B 7/10* | (2006.01) | |
| *B32B 27/30* | (2006.01) | |
| *B32B 27/32* | (2006.01) | |
| *B32B 15/02* | (2006.01) | |
| *B32B 7/06* | (2019.01) | |
| *B32B 29/00* | (2006.01) | |
| *C09J 7/40* | (2018.01) | |
| *B32B 3/08* | (2006.01) | |
| *C09J 7/10* | (2018.01) | |

(52) U.S. Cl.
CPC ............ *B32B 15/02* (2013.01); *B32B 27/308* (2013.01); *B32B 27/32* (2013.01); *B32B 29/00* (2013.01); *C09J 7/10* (2018.01); *C09J 7/40* (2018.01); *B32B 2264/102* (2013.01); *B32B 2264/105* (2013.01); *B32B 2264/108* (2013.01); *B32B 2307/202* (2013.01); *B32B 2307/21* (2013.01); *B32B 2307/40* (2013.01); *B32B 2307/418* (2013.01); *B32B 2307/704* (2013.01); *B32B 2307/732* (2013.01); *C09J 2201/28* (2013.01); *C09J 2201/606* (2013.01); *C09J 2203/334* (2013.01); *Y10T 428/24851* (2015.01); *Y10T 428/24893* (2015.01); *Y10T 442/10* (2015.04)

(56) References Cited

U.S. PATENT DOCUMENTS

| | | |
|---|---|---|
| 5,008,139 A | 4/1991 | Ochi |
| 5,087,494 A | 2/1992 | Calhoun |
| 5,141,790 A * | 8/1992 | Calhoun et al. ............. 428/40.4 |
| 5,296,277 A * | 3/1994 | Wilson ........................ C09J 7/38 428/40.2 |
| 5,468,498 A | 11/1995 | Morrison |
| 5,591,290 A | 1/1997 | Walter |
| 5,637,368 A | 6/1997 | Cadalbert |
| 6,083,616 A | 7/2000 | Dressler |
| 2002/0051295 A1* | 5/2002 | Oka ........................ B29C 70/60 359/586 |
| 2002/0055057 A1* | 5/2002 | Bekku ................. G02F 1/13439 430/256 |
| 2004/0219336 A1 | 11/2004 | Sano |
| 2005/0069683 A1* | 3/2005 | Aylward .................. G03C 1/85 428/195.1 |
| 2005/0208252 A1 | 9/2005 | Hannington |
| 2007/0079869 A1* | 4/2007 | Yukinobu ............ H01G 9/2022 136/263 |
| 2011/0039099 A1* | 2/2011 | Sherman et al. ...... 428/355 AC |

\* cited by examiner

SURFACE-MODIFIED ADHESIVES

CROSS REFERENCE TO RELATED APPLICATIONS

This application is a national stage filing under 35 U.S.C. 371 of PCT/US2010/057176, filed Nov. 18, 2010, which claims priority to U.S. Provisional Patent Application No. 61/263,114, filed Nov. 20, 2009, the disclosure of which is incorporated by reference in its/their entirety herein.

FIELD OF THE DISCLOSURE

The present disclosure relates generally to surface-modified adhesives, methods for modifying adhesive surfaces and articles prepared from surface-modified adhesive surfaces.

BACKGROUND

Adhesives have been used for a variety of marking, holding, protecting, sealing and masking purposes. Adhesives are used in a wide array of products including tapes, decorative articles, optical and electronic devices, medical uses, structural bonding, and the like. One type of adhesive, a pressure sensitive adhesive, is particularly suitable for many applications.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength.

The use of adhesives, especially pressure sensitive adhesives, in areas such as the medical, electronic and optical industries is increasing. The requirements of these industries place additional demands upon the adhesive beyond the traditional properties of tack, peel adhesion and shear strength. New classes of materials and new techniques for preparing and delivering pressure sensitive adhesives have been developed to meet the increasingly demanding performance requirements for pressure sensitive adhesives.

SUMMARY

Methods for modifying adhesive surfaces, modified adhesive surfaces, and articles prepared from modified adhesive surfaces are presented.

In one embodiment, methods of modifying the surface of an adhesive comprise providing an adhesive layer, providing a releasing substrate with an at least partially discontinuous layer on the surface of the substrate, contacting the adhesive layer to the at least partially discontinuous layer on the surface of the substrate, and removing the adhesive layer from the surface of the substrate, such that the at least partially discontinuous layer at least partially adheres to the surface of the adhesive layer upon removal to form a modified adhesive layer surface, and wherein the modified adhesive layer surface remains an adhesive surface.

In another embodiment, methods of modifying the surface of an adhesive comprise providing an adhesive layer, providing a releasing substrate with a substantially continuous frangible layer on the surface of the substrate, contacting the adhesive layer to the substantially continuous frangible layer on the surface of the substrate, applying pressure to the formed adhesive layer and substantially continuous frangible layer causing at least portions of the frangible layer to break, and removing the adhesive layer from the surface of the substrate, such that at least a portion of the broken frangible layer adheres to the surface of the adhesive layer to form a discontinuous layer of particulates on the adhesive layer surface upon removal of the adhesive layer to form a modified adhesive layer surface, wherein the modified adhesive layer surface remains an adhesive surface.

Also disclosed are surface-modified adhesives comprising an adhesive layer comprising a first surface and a second surface wherein the first surface is surface-modified, wherein the surface modification comprises a partially discontinuous layer of particulates or a metal grid or mesh on the first surface.

Also disclosed are adhesive articles comprising an adhesive layer, wherein the adhesive layer comprises a first surface and a second surface, wherein the first surface comprises a surface-modified adhesive surface, and a partially discontinuous layer of particulates on the surface-modified first surface, and a first substrate attached to the first surface of the adhesive layer.

Also disclosed are methods of preparing adhesive articles comprising providing a releasing substrate, preparing a continuous non-adhesive layer on a releasing surface of the releasing substrate, preparing an at least partially discontinuous particulate layer on the surface of the continuous non-adhesive layer, providing an adhesive layer, contacting the adhesive layer to the at least partially discontinuous particulate layer on the surface of the continuous non-adhesive layer, and removing the adhesive layer, such that the at least partially discontinuous particulate layer and the continuous non-adhesive layer at least partially adhere to the surface of the adhesive layer upon removal to form an adhesive article.

DETAILED DESCRIPTION

Figure 1:
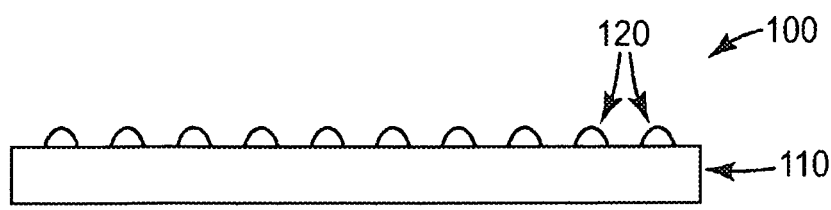
FIG. 1 is a side view of an exemplary embodiment of this disclosure.

The need remains for adhesives, especially pressure sensitive adhesives, that have modified properties. It is particularly desirable to be able to modify the adhesive only at the surface and not throughout the bulk of the adhesive layer. Adding a modifying additive throughout the bulk of the adhesive layer can dramatically change the properties of the adhesive layer and, depending upon the modifying additive, preparing such modified adhesives can be expensive and labor-intensive. For example, modification of optically clear adhesives throughout the bulk of the adhesive with conductive particles to make the adhesive anti-static or conductive may greatly impair the optical properties of the adhesive.

Additionally, the mixing of an anti-static or conductive additive throughout the bulk of the adhesive can add processing time or processing steps to the adhesive formulation as well as expense to the final formulation if, for example the additive is relatively expensive such as silver particles. Modification of the adhesive surface reduces the amount of modifying agent needed as well as minimizing the impact of the modification to the bulk adhesive layer.

In this disclosure, modified adhesive surfaces, methods for modifying adhesive surfaces and articles prepared from modified adhesive surfaces are presented. The surface-modified adhesive comprises an at least partially discontinuous layer on the adhesive surface, and yet the adhesive surface retains its adhesive properties. In other words, the modification of the adhesive surface with an at least partially discontinuous layer does not render the surface non-adhesive. In some embodiments, the at least partially discontinuous layer is a particulate layer. In other embodiments, the at least partially discontinuous layer is a metal grid or mesh.

The surface-modification of the adhesive surface may be achieved by at least two different methods. In some embodiments, the adhesive surface is modified by contacting the surface of an adhesive layer to a releasing substrate with an at least partially discontinuous particulate layer on the surface of the releasing substrate, and removing the adhesive layer from the releasing substrate such that at least a portion of the substantially discontinuous particulate layer adheres to the adhesive surface. In other embodiments, the adhesive surface is modified by contacting the surface of an adhesive layer to a releasing substrate with a metal grid or mesh on the surface of the substrate and removing the adhesive layer from the releasing substrate such that at least a portion of the metal grid or mesh adheres to the adhesive surface. In still other embodiments, the surface modification is achieved by contacting the surface of an adhesive layer to a releasing substrate with a substantially continuous frangible layer on the surface of the substrate, applying pressure to the formed adhesive layer and substantially continuous frangible layer causing at least portions of the frangible layer to break, and removing the adhesive layer from the releasing substrate such that at least a portion of the broken frangible layer adheres to the surface of the adhesive layer to form a discontinuous layer of particulates on the adhesive layer surface upon removal of the adhesive layer to form a modified adhesive layer surface. Regardless of the method used to form the modified adhesive surface, the modified adhesive layer surface thus formed remains an adhesive surface, i.e. the surface has been modified but it is still an adhesive surface and is capable of bonding to substrates.

The term "adhesive" as used herein refers to polymeric compositions useful to adhere together two adherends. Examples of adhesives are heat activated adhesives, and pressure sensitive adhesives.

Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power. Obtaining the proper balance of properties is not a simple process.

The term "at least partially discontinuous particulate layer" as used herein refers to a layer of particles on a surface, either a releasing surface or an adhesive surface, which is not a monolayer, i.e. the layer contains gaps. When the layer of particles is present on a releasing surface to which an adhesive layer is applied, at least a portion of the adhesive layer is able to penetrate the particulate layer and contact the releasing surface. With conductive or antistatic at least partially discontinuous particulate layers, the concentration of conductive or antistatic particles at the adhesive surface is above the percolation threshold. The percolation threshold may be viewed as the point at which a dramatic drop in resistivity is observed for the adhesive layer, indicative of sufficient conductive particle concentration in the adhesive surface to provide a conductive pathway.

The term "releasing surface" as used herein refers to a surface that provides low adhesive strength to adhesives, especially pressure sensitive adhesives. Examples of releasing surfaces include the surfaces of release liners.

The term "release liners" as used herein refers to articles containing at least one release surface. When adhered to an adhesive layer, release liners adhere only lightly and are easily removed. A release liner may be a single layer (with only the base layer) or it may be a multilayer construction (with one or more coatings or additional layers in addition to the base layer). The release liner may also contain a structure such as a microstructure.

The term "frangible layer" as used herein refers to a continuous or substantially continuous layer which is fragile or readily breakable upon the application of pressure. Upon breaking, a frangible layer forms a discontinuous particulate layer.

The term "optically clear" as used herein refers to an adhesive or article that has a high light transmittance over at least a portion of the visible light spectrum (about 400 to about 700 nanometers), and that exhibits low haze. An optically clear material often has a luminous transmission of at least about 90 percent and a haze of less than about 2 percent in the 400 to 700 nm wavelength range. Both the luminous transmission and the haze can be determined using, for example, the method of ASTM-D 1003-95.

The term "nanoparticle" as used herein (unless an individual context specifically implies otherwise) will generally refer to particles, groups of particles, particulate molecules (i.e., small individual groups or loosely associated groups of molecules) and groups of particulate molecules that while potentially varied in specific geometric shape have an effective, or average, diameter that can be measured on a nanoscale (i.e., less than about 100 nanometers).

A variety of methods are disclosed for surface-modified adhesive layers in which the modified adhesive layer surface remains an adhesive surface, i.e. the surface has been modified but it is still an adhesive surface and is capable of bonding to substrates. Such modification is desirable for a variety of purposes including to form anti-static and/or conductive adhesive layers as well as to create optical effects.

A wide variety of adhesives are suitable for forming the adhesive layer which can be modified to form the surface-modified adhesives of this disclosure. Suitable adhesives include, for example, heat activated adhesive and pressure sensitive adhesives. Especially suitable are pressure sensitive adhesives. The adhesive used is chosen to have properties suitable for the desired application. Pressure sensitive adhesives useful in adhesive articles of the present disclosure include those based on natural rubbers, synthetic rubbers, styrene block copolymers, polyvinyl ethers, acrylics, poly-α-olefins, silicones, polyurethanes or polyureas.

Useful natural rubber pressure sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade.

Tackifying resins used with natural rubbers generally include, but are not limited to, wood rosin and its hydrogenated derivatives; terpene resins of various softening points, and petroleum-based resins, such as, the "ESCOREZ 1300" series of C5 aliphatic olefin-derived resins from Exxon, and "PICCOLYTE S" series, polyterpenes from Hercules, Inc. Antioxidants are used to retard the oxidative attack on natural rubber, which can result in loss of the cohesive strength of the natural rubber adhesive. Useful antioxidants include, but are not limited to, amines, such as N—N'-di-β-naphthyl-1,4-phenylenediamine, available as "AGERITE D"; phenolics, such as 2,5-di-(t-amyl)hydroquinone, available as "SANTOVAR A", available from Monsanto Chemical Co., tetrakis[methylene 3-(3',5'-di-tert-butyl-4'-hydroxyphenyl)propionate]methane, available as "IRGANOX 1010" from Ciba-Geigy Corp., and 2-2'-methylenebis(4-methyl-6-tert butyl phenol), available as Antioxidant 2246; and dithiocarbamates, such as zinc dithiodibutyl carbamate. Other materials can be added to natural rubber adhesives for special purposes, wherein the additives can include plasticizers, pigments, and curing agents to partially vulcanize the pressure sensitive adhesive.

Another useful class of pressure sensitive adhesives are those comprising synthetic rubber. Such adhesives are generally rubbery elastomers, which are either self-tacky or non-tacky and require tackifiers.

Self-tacky synthetic rubber pressure sensitive adhesives include for example, butyl rubber, a copolymer of isobutylene with less than 3 percent isoprene, polyisobutylene, a homopolymer of isoprene, polybutadiene, such as "TAKTENE 220 BAYER" or styrene/butadiene rubber. Butyl rubber pressure sensitive adhesives often contain an antioxidant such as zinc dibutyldithiocarbamate. Polyisobutylene pressure sensitive adhesives do not usually contain antioxidants. Synthetic rubber pressure sensitive adhesives, which generally require tackifiers, are also generally easier to melt process. They comprise polybutadiene or styrene/butadiene rubber, from 10 parts to 200 parts of a tackifier, and generally from 0.5 to 2.0 parts per 100 parts rubber of an antioxidant such as "IRGANOX 1010". An example of a synthetic rubber is "AMERIPOL 1011A", a styrene/butadiene rubber available from BF Goodrich. Tackifiers that are useful include derivatives of rosins such as "FORAL 85", a stabilized rosin ester from Hercules, Inc., the "SNOWTACK" series of gum rosins from Tenneco, and the "AQUATAC" series of tall oil rosins from Sylvachem; and synthetic hydrocarbon resins such as the "PICCOLYTE A" series, polyterpenes from Hercules, Inc., the "ESCOREZ 1300" series of $C_5$ aliphatic olefin-derived resins, the "ESCOREZ 2000" Series of $C_9$ aromatic/aliphatic olefin-derived resins, and polyaromatic $C_9$ resins, such as the "PICCO 5000" series of aromatic hydrocarbon resins, from Hercules, Inc. Other materials can be added for special purposes, including hydrogenated butyl rubber, pigments, plasticizers, liquid rubbers, such as "VISTANEX LMMH" polyisobutylene liquid rubber available from Exxon, and curing agents to vulcanize the adhesive partially.

Styrene block copolymer pressure sensitive adhesives generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as "KRATON D1107P", available from Shell Chemical Co., and "EUROPRENE SOL TE 9110", available from EniChem Elastomers Americas, Inc.; linear styrene-(ethylene-butylene) block copolymers such as "KRATON G1657", available from Shell Chemical Co.; linear styrene-(ethylene-propylene) block copolymers such as "KRATON G1750X", available from Shell Chemical Co.; and linear, radial, and star styrene-butadiene block copolymers such as "KRATON D1118X", available from Shell Chemical Co., and "EUROPRENE SOL TE 6205", available from EniChem Elastomers Americas, Inc. The polystyrene blocks tend to form domains in the shape of spheroids, cylinders, or plates that causes the block copolymer pressure sensitive adhesives to have two-phase structures. Resins that associate with the rubber phase generally develop tack in the pressure sensitive adhesive. Examples of rubber phase associating resins include aliphatic olefin-derived resins, such as the "ESCOREZ 1300" series and the "WINGTACK" series, available from Goodyear; rosin esters, such as the "FORAL" series and the "STAYBELITE" Ester 10, both available from Hercules, Inc.; hydrogenated hydrocarbons, such as the "ESCOREZ 5000" series, available from Exxon; polyterpenes, such as the "PICCOLYTE A" series; and terpene phenolic resins derived from petroleum or terpentine sources, such as "PICCOFYN A100", available from Hercules, Inc. Resins that associate with the thermoplastic phase tend to stiffen the pressure sensitive adhesive. Thermoplastic phase associating resins include polyaromatics, such as the "PICCO 6000" series of aromatic hydrocarbon resins, available from Hercules, Inc.; coumarone-indene resins, such as the "CUMAR" series, available from Neville; and other high-solubility parameter resins derived from coal tar or petroleum and having softening points above about 85° C., such as the "AMOCO 18" series of alpha-methyl styrene resins, available from Amoco, "PICCOVAR 130" alkyl aromatic polyindene resin, available from Hercules, Inc., and the "PICCOTEX" series of alpha-methyl styrene/vinyltoluene resins, available from Hercules. Other materials can be added for special purposes, including rubber phase plasticizing hydrocarbon oils, such as, "TUFFLO 6056", available from Lyondell Petrochemical Co., Polybutene-8 from Chevron, "KAYDOL", available from Witco, and "SHELLFLEX 371", available from Shell Chemical Co.; pigments; antioxidants, such as "IRGANOX 1010" and "IRGANOX 1076", both available from Ciba-Geigy Corp., "BUTAZATE", available from Uniroyal Chemical Co., "CYANOX LDTP", available from American Cyanamid, and "BUTASAN", available from Monsanto Co.; antiozonants, such as "NBC", a nickel dibutyldithiocarbamate, available from DuPont; liquid rubbers such as "VISTANEX LMMH" polyisobutylene rubber; and ultraviolet light inhibitors, such as "IRGANOX 1010" and "TINUVIN P", available from Ciba-Geigy Corp.

Polyvinyl ether pressure sensitive adhesives are generally blends of homopolymers of vinyl methyl ether, vinyl ethyl ether or vinyl iso-butyl ether, or blends of homopolymers of vinyl ethers and copolymers of vinyl ethers and acrylates to achieve desired pressure sensitive properties. Depending on the degree of polymerization, homopolymers may be viscous oils, tacky soft resins or rubber-like substances. Polyvinyl ethers used as raw materials in polyvinyl ether adhesives include polymers based on: vinyl methyl ether such as "LUTANOL M 40", available from BASF, and "GANTREZ M 574" and "GANTREZ 555", available from ISP Technologies, Inc.; vinyl ethyl ether such as "LUTANOL A 25", "LUTANOL A 50" and "LUTANOL A 100"; vinyl isobutyl ether such as "LUTANOL 130", "LUTANOL 160", "LUTANOL IC", "LUTANOL 160D" and "LUTANOL 165D"; methacrylate/vinyl isobutyl ether/acrylic acid such as "ACRONAL 550 D", available from BASF. Antioxidants useful to stabilize the polyvinylether pressure sensitive adhesive include, for example, "IONOX 30" available from Shell, "IRGANOX 1010" available from Ciba-Geigy, and antioxidant "ZKF" available from Bayer Leverkusen. Other materials can be added for special purposes as described in BASF literature including tackifiers, plasticizers and pigments.

Acrylic pressure sensitive adhesives generally have a glass transition temperature of about −20° C. or less and may comprise from 100 to 80 weight percent of a $C_3$-$C_{12}$ alkyl ester component such as, for example, isooctyl acrylate, 2-ethylhexyl acrylate and n-butyl acrylate and from 0 to 20 weight percent of a polar component such as, for example, acrylic acid, methacrylic acid, ethylene-vinyl acetate units, N-vinylpyrrolidone, and styrene macromer. Generally, the acrylic pressure sensitive adhesives comprise from 0 to 20 weight percent of acrylic acid and from 100 to 80 weight percent of isooctyl acrylate. The acrylic pressure sensitive adhesives may be self-tacky or tackified. Useful tackifiers for acrylics are rosin esters such as "FORAL 85", available from Hercules, Inc., aromatic resins such as "PICCOTEX LC-55WK", aliphatic resins such as "PICCOTAC 95", available from Hercules, Inc., and terpene resins such as α-pinene and β-pinene, available as "PICCOLYTE A-115" and "ZONAREZ B-100" from Arizona Chemical Co. Other materials can be added for special purposes, including hydrogenated butyl rubber, pigments, and curing agents to vulcanize the adhesive partially.

Poly-α-olefin pressure sensitive adhesives, also called a poly(1-alkene) pressure sensitive adhesives, generally comprise either a substantially uncrosslinked polymer or an uncrosslinked polymer that may have radiation activatable functional groups grafted thereon as described in U.S. Pat. No. 5,209,971 (Babu, et al). The poly-α-olefin polymer may be self tacky and/or include one or more tackifying materials. If uncrosslinked, the inherent viscosity of the polymer is generally between about 0.7 and 5.0 dL/g as measured by ASTM D 2857-93, "Standard Practice for Dilute Solution Viscosity of Polymers". In addition, the polymer generally is predominantly amorphous. Useful poly-α-olefin polymers include, for example, $C_3$-$C_{18}$ poly(1-alkene) polymers, generally $C_5$-$C_{12}$ α-olefins and copolymers of those with $C_3$ or $C_6$-$C_8$ and copolymers of those with $C_3$. Tackifying materials are typically resins that are miscible in the poly-α-olefin polymer. The total amount of tackifying resin in the poly-α-olefin polymer ranges from 0 to 150 parts by weight per 100 parts of the poly-α-olefin polymer depending on the specific application. Useful tackifying resins include resins derived by polymerization of $C_5$ to $C_9$ unsaturated hydrocarbon monomers, polyterpenes, synthetic polyterpenes and the like. Examples of such commercially available resins based on a $C_5$ olefin fraction of this type are "WINGTACK 95" and "WINGTACK 15" tackifying resins available from Goodyear Tire and Rubber Co. Other hydrocarbon resins include "REGALREZ 1078" and "REGALREZ 1126" available from Hercules Chemical Co., and "ARKON P115" available from Arakawa Chemical Co. Other materials can be added for special purposes, including antioxidants, fillers, pigments, and radiation activated crosslinking agents.

Silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea or oxamide terminated hard segments. The tackifying resin is generally a three-dimensional silicate structure that is endcapped with trimethylsiloxy groups (OSiMe$_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif. Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Leir, et al.). Other materials can be added for special purposes, including pigments, plasticizers, and fillers. Fillers are typically used in amounts from 0 parts to 10 parts per 100 parts of silicone pressure sensitive adhesive. Examples of fillers that can be used include zinc oxide, silica, carbon black, pigments, metal powders and calcium carbonate.

Polyurethane and polyurea pressure sensitive adhesives useful in this disclosure include, for example, those disclosed in WO 00/75210 (Kinning et al.) and in U.S. Pat. No. 3,718,712 (Tushaus); U.S. Pat. No. 3,437,622 (Dahl); and U.S. Pat. No. 5,591,820 (Kydonieus et al.).

One class of pressure sensitive adhesives that is particularly suitable are optically clear adhesives. In some embodiments, the optically clear adhesive has a % Transmission of 95% or greater, or even 99% or greater. Also, in some embodiments, the optically clear adhesive has a haze value of 3% or less, or even 1% or less. In some embodiments, the optically clear adhesive has a clarity value of 99% or greater. In some embodiments, the adhesive is an optically clear pressure sensitive adhesive. The pressure sensitive adhesive component can be a single pressure sensitive adhesive or the pressure sensitive adhesive can be a combination of two or more pressure sensitive adhesives.

Optically clear pressure sensitive adhesives useful in the present disclosure include, for example, those based on natural rubbers, synthetic rubbers, styrene block copolymers, (meth)acrylic block copolymers, polyvinyl ethers, polyolefins, and poly(meth)acrylates. The terms (meth)acrylate and (meth)acrylic include both acrylates and methacrylates.

One particularly suitable class of optically clear pressure sensitive adhesives are (meth)acrylate-based pressure sensitive adhesives and may comprise either an acidic or basic copolymer. In many embodiments the (meth)acrylate-based pressure sensitive adhesive is an acidic copolymer. Generally, as the proportion of acidic monomers used in preparing the acidic copolymer increases, cohesive strength of the resulting adhesive increases. The proportion of acidic monomers is usually adjusted depending on the proportion of acidic copolymer present in the blends of the present disclosure.

To achieve pressure sensitive adhesive characteristics, the corresponding copolymer can be tailored to have a resultant glass transition temperature (Tg) of less than about 0° C. Particularly suitable pressure sensitive adhesive copolymers are (meth)acrylate copolymers. Such copolymers typically are derived from monomers comprising about 40% by weight to about 98% by weight, often at least 70% by weight, or at least 85% by weight, or even about 90% by weight, of at least one alkyl(meth)acrylate monomer that, as a homopolymer, has a Tg of less than about 0° C.

Examples of such alkyl(meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl acrylate, and mixtures thereof. Optionally, other vinyl monomers and alkyl (meth)acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl(meth)acrylate monomers and copolymerizable basic or acidic monomers, provided that the Tg of the resultant (meth)acrylate copolymer is less than about 0° C.

In some embodiments, it is desirable to use (meth)acrylate monomers that are free of alkoxy groups. Alkoxy groups are understood by those skilled in the art.

When used, basic (meth)acrylate copolymers useful as the pressure sensitive adhesive matrix typically are derived from basic monomers comprising about 2% by weight to about 50% by weight, or about 5% by weight to about 30% by weight, of a copolymerizable basic monomer. Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinylpyrrolidone, N-vinylcaprolactam, acrylonitrile, N-vinylformamide, (meth)acrylamide, and mixtures thereof.

When used to form the pressure sensitive adhesive matrix, acidic (meth)acrylate copolymers typically are derived from acidic monomers comprising about 2% by weight to about 30% by weight, or about 2% by weight to about 15% by weight, of a copolymerizable acidic monomer. Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, beta-carboxyethyl acrylate, 2-sulfoethyl methacrylate, styrenesulfonic acid, 2-acrylamido-2-methylpropanesulfonic acid, vinylphosphonic acid, and the like, and mixtures thereof. Due to their availability, typically ethylenically unsaturated carboxylic acids are used.

In certain embodiments, the poly(meth)acrylic pressure sensitive adhesive matrix is derived from between about 1 and about 20 weight percent of acrylic acid and between about 99 and about 80 weight percent of at least one of isooctyl acrylate, 2-ethylhexyl acrylate or n-butyl acrylate composition. In some embodiments, the pressure sensitive adhesive matrix is derived from between about 2 and about 10 weight percent acrylic acid and between about 90 and about 98 weight percent of at least one of isooctyl acrylate, 2-ethylhexyl acrylate or n-butyl acrylate composition.

Another useful class of optically clear (meth)acrylate-based pressure sensitive adhesives are those which are (meth)acrylic block copolymers. Such copolymers may contain only (meth)acrylate monomers or may contain other co-monomers such as styrenes. Examples of such pressure sensitive adhesives are described, for example in U.S. Pat. No. 7,255,920 (Everaerts et al.).

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, polymer additives, thickening agents, chain transfer agents and other additives provided that they do not reduce the optical clarity of the pressure sensitive adhesive.

In some embodiments it is desirable for the composition to contain a crosslinking agent. The choice of crosslinking agent depends upon the nature of polymer or copolymer which one wishes to crosslink. The crosslinking agent is used in an effective amount, by which is meant an amount that is sufficient to cause crosslinking of the pressure sensitive adhesive to provide adequate cohesive strength to produce the desired final adhesion properties to the substrate of interest. Generally, when used, the crosslinking agent is used in an amount of about 0.1 part to about 10 parts by weight, based on the total amount of monomers.

One class of useful crosslinking agents include multifunctional (meth)acrylate species. Multifunctional (meth)acrylates include tri(meth)acrylates and di(meth)acrylates (that is, compounds comprising three or two (meth)acrylate groups). Typically di(meth)acrylate crosslinkers (that is, compounds comprising two (meth)acrylate groups) are used. Useful tri(meth)acrylates include, for example, trimethylolpropane tri(meth)acrylate, propoxylated trimethylolpropane triacrylates, ethoxylated trimethylolpropane triacrylates, tris (2-hydroxy ethyl)isocyanurate triacrylate, and pentaerythritol triacrylate. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylates, tripropylene glycol diacrylate, dipropylene glycol diacrylate, cyclohexane dimethanol di(meth)acrylate, alkoxylated cyclohexane.dimethanol diacrylates, ethoxylated bisphenol A di(meth)acrylates, neopentyl glycol diacrylate, polyethylene glycol di(meth)acrylates, polypropylene glycol di(meth)acrylates, and urethane di(meth)acrylates.

Another useful class of crosslinking agents contain functionality which is reactive with carboxylic acid groups on the acrylic copolymer. Examples of such crosslinkers include multifunctional aziridine, isocyanate, epoxy, and carbodiimide compounds. Examples of aziridine-type crosslinkers include, for example 1,4-bis(ethyleneiminocarbonylamino)benzene, 4,4'-bis(ethyleneiminocarbonylamino) diphenylmethane, 1,8-bis(ethyleneiminocarbonylamino) octane, and 1,1'-(1,3-phenylene dicarbonyl)-bis-(2-methylaziridine). The aziridine crosslinker 1,1'-(1,3-phenylene dicarbonyl)-bis-(2-methylaziridine) (CAS No. 7652-64-4), referred to herein as "Bisamide" is particularly useful. Common polyfunctional isocyanate crosslinkers include, for example, trimethylolpropane toluene diisocyanate, tolylene diisocyanate, and hexamethylene diisocyanate.

The adhesive, or the reactive mixture which upon polymerization forms the adhesive, may be coated onto a surface to form the adhesive layer. For example, the adhesive can be applied to films or sheeting products (e.g., optical, decorative, reflective, and graphical), labelstock, tape backings, release liners, and the like. The substrate can be any suitable type of material depending on the desired application.

The adhesive layer can be formed by either continuous or batch processes. An example of a batch process is the placement of a portion of the adhesive between a substrate to which the film or coating is to be adhered and a surface capable of releasing the adhesive film or coating to form a composite structure. The composite structure can then be compressed at a sufficient temperature and pressure to form an adhesive layer of a desired thickness after cooling. Alternatively, the adhesive can be compressed between two release surfaces and cooled to form an adhesive transfer tape useful in laminating applications.

Continuous forming methods include drawing the adhesive out of a film die and subsequently contacting the drawn adhesive to a moving plastic web or other suitable substrate. A related continuous method involves extruding the adhesive and a coextruded backing material from a film die and cooling the layered product to form an adhesive tape. Other continuous forming methods involve directly contacting the adhesive to a rapidly moving plastic web or other suitable preformed substrate. Using this method, the adhesive is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

Adhesives can also be coated using a solvent-based method. For example, the adhesive can be coated by such methods as knife coating, roll coating, gravure coating, rod coating, curtain coating, and air knife coating. The adhesive mixture may also be printed by known methods such as screen printing or inkjet printing. The coated solvent-based adhesive is then dried to remove the solvent. Typically, the coated solvent-based adhesive is subjected to elevated temperatures, such as those supplied by an oven, to expedite drying of the adhesive.

The thickness of the adhesive layer tends to be at least about 1 micrometer, at least 5 micrometers, at least 10 micrometers, at least 15 micrometers, or at least 20 micrometers. The thickness is often no greater than about 200 micrometers, no greater than about 175 micrometers, no greater than about 150 micrometers, or no greater than about 125 micrometers. For example, the thickness can be 1 to 200 micrometers, 5 to 100 micrometers, 10 to 50 micrometers, 20 to 50 micrometers, or 1 to 15 micrometers.

The adhesive layer is contacted to a releasing substrate which contains either an at least partially discontinuous particulate layer, a metal grid or mesh, or a substantially continuous frangible layer. The releasing substrate may be any suitable releasing substrate such as a release liner or a substrate containing a releasing surface. Suitable substrates containing a releasing surface include plates, sheets and film substrates. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface. Examples of substrates containing a releasing surface include, for example, substrates that contain low surface energy surfaces such as TEFLON substrates, and polyolefin substrates such as polypropylene or polyethylene, or substrates which contain a release coating such as a silicone, olefinic, long alkyl chains or fluorochemical coating.

It has been discovered that it is desirable to select a releasing substrate with a release surface on which precursor solutions or mixtures that form the at least partially discontinuous particulate layer or substantially continuous frangible layer exhibit good wet-out on the release surface. Also, it is desirable that the at least partially discontinuous particulate layer or substantially continuous frangible layer is not bound to the release surface, i.e. the at least partially discontinuous particulate layer or substantially continuous frangible layer are easily removed (for example, peeled away) from the release surface by the adhesive layer.

An example of a particularly suitable release liner is presented in US Patent Publication No. 2009/0000727 (Kumar et al.). This release liner comprises a release material, where the release material can be formed by irradiating (for example, by using an UV ray or electron beam) a release material precursor having shear storage modulus of about $1\times10^2$ Pa to about $3\times10^6$ Pa at 20° C. and a frequency of 1 Hz. The release material (after irradiation) has a contact angle of 15° or more, measured using a mixed solution of methanol and water (volume ratio 90:10) having a surface tension of 25.4 mN/m. Examples of suitable release material precursors include polymers having a shear storage modulus within the above-described range, such as, for example, a poly(meth)acrylic ester, a polyolefin, or a polyvinyl ether.

An example of a useful release material precursor is a copolymer having two kinds of acrylic monomer components such as, for example, a (meth)acrylate containing an alkyl group having from about 12 to about 30 carbon atoms (hereinafter referred to as a "first alkyl(meth)acrylate") and a (meth)acrylate containing an alkyl group having from 1 to about 12 carbon atoms (hereinafter referred to as a "second alkyl(meth)acrylate").

The first alkyl(meth)acrylate contains a relatively long alkyl side chain having from about 12 to about 30 carbon atoms that helps to decrease the surface energy of the release material. Accordingly, the first alkyl(meth)acrylate acts to impart a low release strength to the release material. The first alkyl(meth)acrylate typically does not contain a polar group (for example, a carboxyl group, a hydroxyl group, or a nitrogen- or phosphorus-containing polar group) on the side chain. Accordingly, the first alkyl(meth)acrylate can impart relatively low release strength to the release material, not only at low temperatures, but also even after exposure to relatively high temperatures.

Suitable examples of the first alkyl(meth)acrylate having a long chain alkyl group include lauryl(meth)acrylate, cetyl (meth)acrylate, (iso)octadecyl(meth)acrylate, and behenyl (meth)acrylate. The first alkyl(meth)acrylate is typically present in an amount of about 10% to about 90% by weight based on the total amount of the first alkyl(meth)acrylate and the second alkyl(meth)acrylate.

The second alkyl(meth)acrylate contains a relatively short alkyl side chain having from 1 to about 12 carbon atoms. This relatively short alkyl side chain decreases the glass transition temperature of the release material to about 30° C. or less. In turn, the release material precursor is reduced in crystallinity and also in the shear storage modulus.

In one embodiment, the second alkyl(meth)acrylate containing an alkyl group having 12 carbon atoms is the same as the first alkyl(meth)acrylate having 12 carbon atoms. In this case, unless other components are present, the release material can be formed from a release material precursor containing a homopolymer.

Furthermore, the second alkyl(meth)acrylate typically does not contain a polar group on the side chain. Therefore, similarly to the first alkyl(meth)acrylate, the second alkyl (meth)acrylate imparts a relatively low release strength, not only at a low temperature, but also at a relatively high temperature.

Suitable examples of the second (meth)acrylate having a short chain alkyl group include butyl(meth)acrylate, hexyl (meth)acrylate, octyl(meth)acrylate, and lauryl(meth)acrylate. The second alkyl(meth)acrylate is typically present in an amount of about 10% to about 90% by weight based on the total amount of the first alkyl(meth)acrylate and the second alkyl(meth)acrylate.

The first and/or the second alkyl(meth)acrylates may be a (meth)acrylate having a branched side chain such as 2-heptylundecyl acrylate, 2-ethylhexyl(meth)acrylate, or isononyl (meth)acrylate. (Meth)acrylates having a branched side chain reduce the crystallinity and therefore decrease the shear storage modulus and the surface energy. A homopolymer consisting of a monomer component of alkyl(meth) acrylate containing a branched alkyl group having from about 8 to about 30 carbon atoms can be useful as the release material precursor. For example, a homopolymer of 2-heptylundecyl acrylate is a desirable release material precursor from the standpoint that the obtained release material can be reduced in surface energy and shear storage modulus. A copolymer comprising a monomer component of alkyl (meth)acrylate containing a straight alkyl group and a monomer component of alkyl(meth)acrylate containing a branched alkyl group having from about 8 to about 30 carbon atoms can also be useful as the release material precursor. For example, a copolymer of stearyl acrylate and isostearyl acrylate is also a desirable release material precursor from the standpoint that the obtained release material can be reduced in surface energy and shear storage modulus.

Release material precursors can be obtained by polymerization of alkyl(meth)acrylates in the presence of a polymerization initiator. The polymerization initiator is not particularly limited as long as it can bring about the polymerization. Examples of useful polymerization initiators include azobis compounds such as 2,2'-azobisisobutyronitrile, 2,2'-azobis(2-methylbutyronitrile), and 2,2'-azobis (2-methylvaleronitrile and peroxides such as benzoyl peroxide and lauroyl peroxide. Some polymerization initiators are commercially available, such as 2,2'-azobisisobutyronitrile and 2,2'-azobis(2-methylbutyronitrile), which are available as V-60 and V-59 from Wako Pure Chemical Industries, Ltd. (Osaka, Japan). The amount of polymerization initiator can vary, but the polymerization initiator is typically used in an amount of about 0.005% to about 0.5% by weight based on the weight of the monomer.

The polymerization of the above-described alkyl(meth) acrylates can be performed by any known method. For example, a solution polymerization method, which involves dissolving the alkyl(meth)acrylates in a solvent and polymerizing them in solution can be used. The polymer solution can be directly taken out and used after the completion of polymerization. In this case, the solvent to be used is not particularly limited. Some examples of suitable solvents include ethyl acetate, methyl ethyl ketone, and heptane. A chain transfer agent can also be incorporated into the solvent in order to control molecular weight. The solution polymerization of the polymerizable composition can typically be performed at a reaction temperature of about 50° C. to about 100° C. for about 3 to about 24 hours in an atmosphere of an inert gas such as nitrogen.

When the release material precursor is a poly(meth) acrylate, the release material polymer typically has a weight average molecular weight of about 100,000 to about 2,000, 000. If the weight average molecular weight is less than about 100,000, the release strength may increase, whereas if the weight average molecular weight exceeds about 2,000, 000, the viscosity of the polymer solution may be increased during synthesis, making handling of the polymer solution relatively difficult.

As long as the above-described physical properties can be attained, the release material can be a polyolefin. The polyolefin can be formed from an olefin monomer having from about 2 to about 12 carbon atoms. Examples of useful olefin monomers include linear olefins such as ethylene, propylene, 1-butene, 1-pentene, 1-hexene, 1-heptene, 1-octene, 1-nonene, 1-decene, 1-undecene, 1-dodecene, and branched olefins such as 4-methyl-1-pentene, 5-methyl-1-hexene, 4-methyl-1-hexene, 7-methyl-1-octene, and 8-methyl-1-nonene. However, a homopolymer of ethylene or propylene, namely polyethylene and polypropylene, generally cannot satisfy the physical properties of shear storage modulus because of their crystallinity. Therefore, when using ethylene, propylene, or the like, the shear storage modulus is typically decreased by copolymerization, for example, with 1-butene, 1-octene, or the like.

With respect to the copolymer structure, a random copolymer is desirable from the standpoint of reducing crystallinity. However, even if the copolymer has crystallinity, as long as the shear storage modulus is acceptable, a block copolymer can be used. The weight average molecular weight is typically from about 100,000 to about 2,000,000. Polyolefins having a high molecular weight can be produced by conventionally known polymerization methods such as, for example, ionic polymerization, generally coordinated anionic polymerization.

Examples of useful commercially available polyolefins include ethylene/propylene copolymers available from JSR Corporation (Tokyo, Japan) as EP01P and EP912P, and an ethylene/octene copolymer available from Dow Chemical as ENGAGE 8407.

The release material precursor can also be a polyvinyl ether having the above-described properties. Examples of the starting monomer for a polyvinyl ether include linear or branched vinyl ethers such as n-butyl vinyl ether, 2-hexyl vinyl ether, dodecyl vinyl ether, and octadecyl vinyl ether. However, for example, polyoctadecyl vinyl ether does not satisfy the above-described physical properties for the shear storage modulus. Therefore, when using octadecyl vinyl ether, the shear storage modulus is typically decreased by copolymerization, for example, with 2-ethylhexyl vinyl ether.

With respect to the copolymer structure, a random copolymer is desirable from the standpoint of reducing crystallinity. However, even if the copolymer has crystallinity, as long as the shear storage modulus is acceptable, a block copolymer can be used. The weight average molecular weight is typically from about 100,000 to about 2,000,000. The polyvinyl ether can be produced by ionic polymerization such as, for example, by cationic polymerization.

The release material precursor can be provided on a liner substrate, typically a liner substrate comprising polyester, polyolefin, or paper. The release material precursor can then be subjected to a treatment of radiation, for example, by using an electron beam or UV rays. The release material precursor generally has no polar functional groups such as carboxyl groups, hydroxyl groups, or amide groups. Therefore, it would be expected that the release material precursor would exhibit poor anchoring to the liner substrate. However, despite the absence of a polar functional group in the release material precursor, the anchoring between the liner substrate and the release material can be increased by treatment with radiation.

The release liner can be manufactured as follows. A solution of the release material precursor can be diluted with a diluent, for example, containing at least one of ethyl acetate, butyl acetate, methyl ethyl ketone, methyl isobutyl ketone, hexane, heptane, toluene, xylene, and methylene chloride, and then coated on a liner substrate to a predetermined thickness, thereby forming a release material precursor layer on the liner substrate. The diluent can be the same as or different from the solvent used in the solution polymerization.

Examples of liner substrates that can be used include, plastics such as polyesters (for example, polyethylene terephthalate, polyethylene naphthalate, or polybutylene terephthalate film) and polyolefins, and paper. The thickness of the release material precursor depends on the type of liner substrate but is generally from about 0.01 to about 1 micrometer, more typically from about 0.05 to about 0.5 micrometer.

The release material precursor can be irradiated by, for example, an electron beam or ultraviolet ray. In the case of using an electron beam, the irradiation is typically performed under an inert gas such as nitrogen. The absorbed dose depends on the thickness and composition of the release material precursor layer and is usually from about 1 to about 100 kGy. If an ultraviolet ray is used, the irradiation energy of the release material precursor layer is usually from about 10 to about 300 mJ/cm$^2$ more typically from about 20 to about 150 mJ/cm$^2$.

An example of another useful release material precursor is an acrylic release agent precursor which comprises a poly(meth)acrylate ester having a group capable of being activated by ultraviolet radiation (also referred to as "an ultraviolet active group") and has a shear storage modulus of about $1\times10^2$ to about $3\times10^6$ Pa at 20° C. and a frequency of 1 Hz. The acrylic release agent precursor, after irradiation with ultraviolet radiation, has a contact angle of about 15° or more to a mixed solution of methanol and water (volume ratio of 90:10) having a wetting tension of 25.4 mN/m.

The acrylic release agent precursor can be a polymer composition comprising a polymer such as a poly(meth)acrylate ester having an ultraviolet active group. The poly (meth)acrylate is, for example, a copolymer formed from a first alkyl(meth)acrylate as described above, a second alkyl (meth)acrylate as described above, and a (meth)acrylate ester having an ultraviolet active group.

Suitable first alkyl(meth)acrylates containing a long alkyl side chain for the acrylic release agent precursor include lauryl(meth)acrylate, cetyl(meth)acrylate, stearyl(meth) acrylate, and behenyl(meth)acrylate.

The copolymer typically contains the first alkyl(meth) acrylate or second alkyl(meth)acrylate in an amount from about 10 to about 90% by weight based on the total weight of the first and second alkyl(meth)acrylates.

The poly(meth)acrylate ester can also be derived from a monomer component containing an alkyl(meth)acrylate having a branched alkyl group having from about 8 to about 30 carbon atoms and a (meth)acrylate ester having an ultraviolet active group. Examples of suitable alkyl(meth) acrylate having a branched alkyl group include 2-ethylhexyl (meth)acrylate, 2-hexyldodecyl acrylate, 2-heptylundecyl acrylate, 2-octyldecyl acrylate, and isononyl(meth)acrylate.

Such a (meth)acrylate having a branched side chain can reduce the shear storage modulus and surface energy by lowering the crystallinity. Thus, it is not necessary for the acrylic release agent precursor to contain two components such as a first alkyl(meth)acrylate and a second alkyl(meth) acrylate described above if it has a branched alkyl group having from about 8 to about 30 carbon atoms. For example, the polymer of 2-hexyldecyl acrylate or 2-octyldecyl acrylate can reduce the surface energy of the release agent.

Typically, the monomer component has no polar groups on the side chain. However, the monomer component may, for example, have a polar functional group on the side chain as long as the acrylic release agent precursor has a shear storage modulus as described above.

The poly(meth)acrylate ester has an ultraviolet active group. This ultraviolet active group can generate a free radical in the acrylic release agent precursor by irradiation with ultraviolet radiation. The generated free radical promotes crosslinking of the acrylic release agent precursor and adhesion to the liner substrate, resulting in an improvement in adhesion between the liner substrate and the release agent. Generally, the amount of the (meth)acrylate ester having an ultraviolet active group is within a range of about 0.01 to about 1% by weight of polymer.

The ultraviolet active group is not specifically limited, but is typically derived from benzophenone or acetophenone. Introduction of the ultraviolet active group into the poly (meth)acrylate ester can be conducted by incorporating a (meth)acrylate ester having an ultraviolet active group as a monomer component and polymerizing the monomer component containing the (meth)acrylate ester.

The polymer of the acrylic release agent precursor generally has a weight-average molecular weight within a range from about 100,000 to about 2,000,000.

The monomer component described above can be polymerized in the presence of a polymerization initiator to form an acrylic release agent precursor. Generally, the polymerization is carried out in solution. Solution polymerization can typically be conducted in the state where the monomer component is dissolved in a solvent, together with the polymerization initiator, in an atmosphere of an inert gas such as nitrogen at about 50° to about 100° C. Solvents such as, for example, ethyl acetate, methyl ethyl ketone, or heptane can be used. Optionally, the molecular weight of the polymer can be controlled by adding a chain transfer agent to the solvent.

The polymerization initiator is not specifically limited. For example, an azobis compound such as 2,2'-azobisisobutyronitrile, 2,2'-azobis(2-methylbutyronitrile) or 2,2'-azobis (2,4-dimethylvaleronitrile), dimethyl 2,2'-azobis(2-methylpropionate) or a peroxide such as benzoyl peroxide or lauroyl peroxide can be used as the polymerization initiator. Generally, the polymerization initiator is used in the amount within a range from 0.005 to 0.5% by weight based on the total weight of the monomer component.

The acrylic release agent precursor as described above is converted into an acrylic release agent by irradiating with ultraviolet radiation, after the precursor is coated on a liner substrate. Typically, the acrylic release agent is formed on the liner substrate in the thickness within a range from 0.01 to 1 micrometer. The acrylic release agent is generally obtained by irradiating with ultraviolet radiation after coating with the acrylic release agent precursor. As disclosed in WO 01/64805 and/or KOKAI (Japanese Unexamined Patent Publication) No. 2001-240775, the acrylic release agent adheres to the liner substrate by the irradiation with ultraviolet radiation, even though the acrylic release agent typically has no polar functional group. The liner substrate can be, for example, a film made of plastic such as polyester or polyolefin (for example, polyethylene terephthalate, polyethylene naphthalate or polybutylene terephthalate) or a paper. Typical thickness of the liner substrate is within a range from about 10 to about 300 micrometers.

Usually, the acrylic release agent precursor is produced by solution polymerization as described above and exists in the state of a polymer solution. Therefore, the liner substrate can be coated with the polymer solution in a thickness typically within a range from about 0.01 to about 1 micrometer, more typically from 0.05 to 0.5 micrometer, using coating means such as a bar coater. If necessary, the polymer solution can be applied after diluting with a diluent until a predetermined viscosity is achieved. Examples of the diluent include ethyl acetate, butyl acetate, methyl ethyl ketone, methyl isobutyl ketone, hexane, heptane, toluene, xylene, and methylene chloride.

The acrylic release agent precursor applied as described above is converted into an acrylic release agent by irradiation with ultraviolet radiation. The dose of irradiation with ultraviolet radiation varies depending on the kind and structure of the poly(meth)acrylate, but can usually be a low dose within a range from 10 to 150 mJ/cm$^2$.

A variety of different materials may be selected to comprise the at least partially discontinuous layer on the release surface. The choice of materials is typically determined by the modification desired for the adhesive layer. For example, if the desired modification is to make the adhesive layer a conductive, partially conductive or anti-static layer, the choice of materials will include materials that have these properties.

If the at least partially discontinuous layer is a particulate layer, a wide variety of materials may be used to prepare this layer. Examples of suitable materials for the at least partially discontinuous particulate layer include, for example: one-dimensional conductive materials such as nanowires, nanorods, and nanotubes; conductive, semi-conductive or anti-static particles such as metal nanoparticles or metal oxide nanoparticles; carbon nanoparticles; and high refractive index particles.

An exemplary embodiment of a releasing substrate with a discontinuous particulate layer disposed on it is shown in FIG. 1. FIG. 1 shows a side view of construction 100 comprising releasing substrate 110 and a discontinuous particulate layer 120 disposed on the releasing substrate 110. Releasing substrate 110 and particulate layer 120 are not drawn to scale.

A variety of different techniques are useful to prepare the at least partially discontinuous particulate layer on the release surface. The choice of technique used typically depends upon the nature of materials used to form the at least partially discontinuous particulate layer as well as the modification desired for the adhesive layer. Particles may be directly deposited onto the release surface or a precursor solution or mixture may be coated or printed onto the release surface and allowed to either dry or cure to form the at least partially discontinuous particulate layer. As mentioned above, when a precursor solution or mixture is used, it is desirable that the precursor solution or mixture wet out the release surface to allow the formation of an at least partially discontinuous particulate layer instead of an agglomerated layer.

When a precursor solution or mixture is used, the precursor solution or mixture may be a solution, suspension, dispersion, or 100% solids mixture. In some embodiments, the precursor is a suspension or dispersion of nanoparticles in liquid media. The liquid media typically is water, a water miscible solvent or a combination thereof. The precursor mixture can be coated onto the release surface using any suitable coating technique such as, for example, knife coating, roll coating, gravure coating, rod coating, curtain coating, and air knife coating. The precursor mixture may also be printed by known methods such as screen printing and inkjet printing. The coating is typically then dried to remove the liquid media. In some embodiments, the coating is subjected to increased temperatures such as supplied by an oven (e.g. a forced air oven) in order to expedite the drying. The coatings may be applied in a discontinuous fashion (for example by printing) and dried to form the discontinuous layer. Alternatively, the coating may be applied as a continuous fashion (for example by rod coating) where the discontinuous layer forms on the release layer upon drying due to nature of the wet out of the precursor mixture on the release layer or the low concentration of the nanoparticles in the liquid media.

The precursor mixture may comprise, for example, one-dimensional conductive materials such as nanowires, nanorods, and nanotubes; conductive, semi-conductive or anti-static particles such as metal nanoparticles or metal oxide nanoparticles; carbon nanoparticles; and/or high refractive index particles in liquid media. The liquid media may comprise, for example water, an alcohol such as methanol, ethanol, isopropanol, a ketone such as acetone or methyl ethyl ketone, an ester such as ethyl acetate, or a combination thereof. Surfactants may also be included to modify the wetting properties of the liquid media.

Examples of suitable one-dimensional conductive materials include nanowires, nanorods, and nanotubes. Such conductive materials include silver nanowires (as described in Y. Sun, B. Gates, B. Mayers, and Y. Xia, *Nanoletters*, 2002, 2, 165-168) and those disclosed in the PCT Patent Publication WO 2007/022226 (Alden et al.), vanadium pentoxide nanowires, and carbon nanotubes (CNT). Commercially available CNT dispersions include CNTD-294 (17% wt CNT in methyl ethyl ketone), CNTD-268 (13% wt CNT in isopropanol), CNTDW-80 (11.5% wt CNT in water), CNTD-262 (1% wt CNT in water), CNTD-260 (1% wt CNT in isopropanol), CNTD-272 (1% wt CNT in methyl ethyl ketone), and CNTD-253 (1% wt in ethanol), from Mikuni-Color Ltd. Hyogo, Japan.

Examples of suitable carbon nanoparticles include, for example, suspensions of carbon black particles such as aqueous carbon black dispersions commercially available from Solution Dispersions under the trade names AJACK BLACK and AQUABLAK (printable formulations).

Examples of suitable conductive or semi-conductive particles include metal and metal oxide nanoparticles. Such nanoparticles typically have a particle size or associated particle size of greater than 1 nm and less than 200 nm. Conductive particles are generally metal nanoparticles, such as silver and gold, or binary metal oxides doped with appropriate donor heteroatoms or containing oxygen deficiencies. Suitable conductive binary metal oxides may comprise: zinc oxide, titania, tin oxide, alumina, indium oxide, magnesia, zirconia, barium oxide, molybdenum trioxide, tungsten trioxide, and vanadium pentoxide. Particularly useful doped conductive metal oxide granular particles include Sb-doped tin oxide, Al-doped zinc oxide, In-doped zinc oxide, and Sb-doped zinc oxide.

Metal oxide particles may also include antistatic particles. Various antistatic particles are commercially available as water-based and solvent-based dispersions. Antimony tin oxide (ATO) nanoparticle dispersions that can be used include a dispersion available from Air Products under the trade designation "NANO ATO S44A" (25 wt-% solids, water), 30 nm and 100 nm (20 wt-% solids, water) ATO dispersions available from Advanced Nano Products Co. Ltd. (ANP), 30 nm and 100 nm ATO sols (30 wt-% in isopropanol) also available from ANP, a dispersion available from Keeling & Walker Ltd under the trade designation "CPM10C" (19.1 wt-% solids), and a dispersion commercially available from Ishihara Sangyo Kaisha, Ltd under the trade designation "SN-100 D" (20 wt-% solids). Antimony zinc oxide (AZO) sols (20 nm, 20.8 wt-% solids) are available from Nissan Chemical America, Houston Tex. under the trade designations "CELNAX CX—Z210IP" (in isopropanol), "CELNAX CX-Z300H" (in water), "CELNAX CX-Z401M" (in methanol), and "CELNAX CX-Z653M-F" (in methanol).

A variety of different materials may be used as high refractive index particles.

Examples of such nanoparticles include, for example, zirconia ("$ZrO_2$"), titania ("$TiO_2$"), antimony oxides, alumina, and tin oxides, alone or in combination. Mixed metal oxides may also be suitable. The refractive index of the high refractive index particles is at least 1.60, 1.65, 1.70, 1.75, 1.80, 1.85, 1.90, 1.95, or 2.00.

Examples of suitable zirconia nanoparticles for use as high refractive index nanoparticles include those commercially available from Nalco Chemical Co. under the trade designation "Nalco OOSSOO8" and from Buhler AG Uzwil, Switzerland under the trade designation "Buhler zirconia Z—WO sol". Zirconia nanoparticles can also be prepared such as described in U.S. Pat. Nos. 7,241,437 and 6,376,590.

Typically the at least partially discontinuous particulate layer, when present on the releasing substrate, is very thin relative to the thickness of the adhesive layer. Typically the at least partially discontinuous particulate layer has an average thickness of from about 10 nanometers to about 10 micrometers. In some embodiments the thickness is 10 nanometers to 1 micrometer, or 10 nanometers to about 500 nanometers, or even 100 nanometers to 500 nanometers.

In embodiments in which the at least partially discontinuous layer is a metal grid or mesh, typically the grid or mesh is prepared on a releasing substrate by first depositing a continuous layer of metal onto the releasing substrate and then removing portions of the continuous layer to form the grid or mesh. Techniques suitable for direct depositing of a metal layer onto the release surface include, for example, vacuum deposition. Examples of suitable metals include, for example, copper, chromium, aluminum, nickel, gold, silver, and tungsten. Typically the metal layer is relatively thin, for example between 100 and 500 nanometers or even between 100 and 300 nanometers. A discontinuous masking layer can then be applied to the metal layer. The masking layer can be a variety of different materials and can be applied in a variety of different ways. In some embodiments, the discontinuous masking layer is a curable ink which can be applied by printing techniques such as inkjet printing. The discontinuous masking layer may be applied randomly or in a pattern such as a grid. The curable ink masking layer can be cured (for example by heat or UV radiation) to yield a discontinuously masked metal layer. The metal layer can then by chemically etched and portions of the metal layer removed. Removal of the masking layer by, for example, a solvent can leave a discontinuous metal layer on the release surface. In some embodiments the discontinuous metal layer on the release surface is in the form of a grid comprising copper, silver, or aluminum.

Typically, when a metal grid or mesh is the adhesive surface modifying layer, because the mesh or grid is more regular than a discontinuous particulate layer, it is easier to calculate the percentage of the adhesive surface that is covered by the metal grid and therefore percentage of the surface that is adhesive material. Typically, the majority of adhesive layer surface area is adhesive material. In some embodiments the surface area is 80-90% adhesive material.

A variety of different materials may be selected to comprise the substantially continuous frangible layer on the release surface. The choice of materials is typically determined by the modification desired for the adhesive layer. For example, if the desired modification is to make the adhesive layer a conductive, partially conductive or anti-static layer, the choice of materials will include materials that have these properties.

Suitable materials for the preparation of the substantially continuous frangible layer include, for example, conductive polymers, carbon nanoparticles, and metal or metal oxide nanoparticles.

Figure 2:
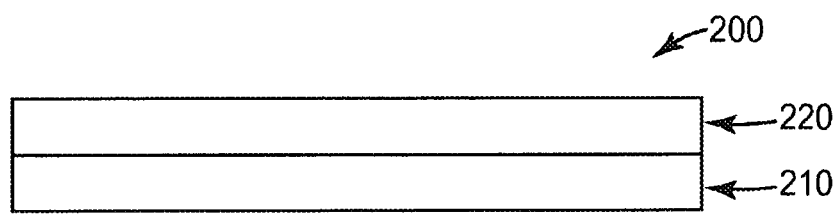
FIG. 2 is a side view of an exemplary embodiment of this disclosure.

An exemplary embodiment of a releasing substrate with a continuous frangible layer disposed on it is shown in FIG. 2. FIG. 2 shows a side view of construction 200 comprising releasing substrate 210 and a continuous frangible layer 220 disposed on the releasing substrate 210. Releasing substrate 210 and continuous frangible layer 220 are not drawn to scale.

A variety of different techniques are useful to prepare the substantially continuous frangible layer on the release surface. A continuous layer of material may be directly deposited onto the release surface or a precursor solution or mixture may be coated or printed onto the release surface and allowed to either dry or cure to form the substantially continuous frangible layer.

Techniques suitable for directly depositing metal or metal oxide layers onto the release surface include, for example, vacuum deposition or sputter coating. In some embodiments, a substantially continuous layer of metal such as copper, silver or aluminum, can be vacuum coated or sputter coated onto the release surface. Additionally, metal oxides such as indium tin oxide can be sputter coated onto the releasing substrate. Typically the metal layer is relatively thin, for example between 100 and 500 nanometers or even between 100 and 300 nanometers.

When a precursor solution or mixture is used, the precursor solution or mixture may be a solution, suspension, dispersion, or 100% solids mixture. In some embodiments, the precursor is a suspension or dispersion of nanoparticles in liquid media. The liquid media typically are water, a water miscible solvent or a combination thereof. The precursor mixture can be coated onto the release surface using any suitable coating technique such as, for example, knife coating, roll coating, gravure coating, rod coating, curtain coating, and air knife coating. The precursor mixture may also be printed by known methods such as screen printing and inkjet printing. The coating is typically then dried to remove the liquid media. In some embodiments, the coating is subjected to increased temperatures such as supplied by an oven (e.g. a forced air oven) in order to expedite the drying.

The substantially continuous layer thus formed is frangible, and upon contacting the surface of an adhesive layer to the substantially continuous frangible layer and applying pressure to the formed adhesive layer and substantially continuous frangible layer causes at least portions of the frangible layer to break. Upon removal of the adhesive layer from the releasing substrate, at least a portion of the broken frangible layer adheres to the surface of the adhesive layer to form a discontinuous layer of particulates on the adhesive layer surface.

Examples of suitable materials for the preparation of the substantially continuous frangible layer include, for example, conductive polymers, carbon nanoparticles, and metal or metal oxide nanoparticles.

In some embodiments, the substantially continuous frangible layer may be a very thin layer of conductive polymer. A variety of different conductive polymers may be used. Examples of suitable conductive polymers include polyaniline and derivatives thereof, polypyrrole, and polythiophene and derivatives thereof. One particularly suitable polymer is poly(ethylenedioxythiophene) (PEDOT) such as poly(ethylenedioxythiophene) doped with poly(styrenesulfonic acid) (PEDOT:PSS) commercially available from H. C. Starck, Newton, Mass. under the trade name "CLEVIOS P" or from Agfa-Gevaert under the trade name "ORGACON".

In some embodiments, the substantially continuous frangible layer may be a very thin layer of nanoparticles. Examples of suitable carbon nanoparticles, metal nanoparticles and metal oxide nanoparticles include those described above as useful as precursors to prepare the at least partially discontinuous particulate layer.

Typically, the substantially continuous frangible layer, when present on the releasing substrate, is very thin relative to the thickness of the adhesive layer. Typically the substantially continuous frangible layer has an average thickness of from about 10 nanometers to about 10 micrometers. In some embodiments the thickness is 10 nanometers to 1 micrometer, or 10 nanometers to about 500 nanometers, or even 100 nanometers to 500 nanometers.

In some embodiments, microstructured release substrates can be used to induce frangibility in a continuous layer. A microstructured release substrate can be covered with a continuous and very thin layer of metal. Upon application and removal of the adhesive layer, only the portions of the metal layer which were at the top structures of the microstructured release substrate may be transferred to the adhesive layer.

As described above, various processes can be used to produce a surface-modified adhesive layer. In each embodiment, a modifying layer is deposited onto a releasing surface. This modifying layer may be an at least partially discontinuous particulate layer, a metal grid or mesh, or it may be substantially continuous frangible layer. An adhesive layer is contacted to the modifying layer.

In embodiments where the modifying layer is an at least partially discontinuous particulate layer, the adhesive layer may then be removed from the releasing substrate and at least portions of the at least partially discontinuous particulate layer are transferred to the surface of the adhesive layer, to produce a surface-modified adhesive layer. Despite the presence of the transferred particulate layer, the adhesive surface remains an adhesive surface, i.e. it is able to bond to substrates. Removal of the adhesive may be done quickly after the adhesive layer contacts the modifying layer or the releasing surface/modifying layer/adhesive layer construction may remain together for extended periods of time, allowing for the construction to be transported to a different location before the modified adhesive layer is produced, for example.

In some embodiments, it may be desirable to apply heat to the releasing surface/modifying layer/adhesive layer construction to facilitate the transfer of the modifying layer to the adhesive layer. This is particularly applicable when the adhesive layer is a heat activated adhesive or a relatively stiff pressure sensitive adhesive. While useful in some embodiments, the application of heat is typically not necessary to transfer the modifying layer to the adhesive layer.

In embodiments where the adhesive layer contacts a substantially continuous frangible layer, pressure is applied to the releasing surface/modifying layer/adhesive layer construction to cause at least some breakage of the frangible layer. In this way the frangible layer becomes an at least partially discontinuous particulate layer upon application of pressure. The entire frangible layer may break to form an at least partially discontinuous particulate layer or only a portion of the frangible layer may break, as long as the breakage permits the adhesive layer to penetrate sufficiently to the releasing surface to be removable from the releasing surface. The adhesive layer may then be removed from the releasing substrate and at least portions of the at least partially discontinuous particulate layer are transferred to the surface of the adhesive layer, to produce a surface-modified adhesive layer. All of the at least partially discontinuous particulate layer produced by breaking the frangible layer may transfer to the surface of the adhesive layer or only a portion may transfer. Despite the presence of the transferred particulate layer, the adhesive surface remains an adhesive surface, i.e. it is able to bond to substrates. Removal of the adhesive may be done quickly after the adhesive layer contacts the modifying layer or the releasing surface/modifying layer/adhesive layer construction may remain together for extended periods of time, allowing for the construction to be transported to a different location before the modified adhesive layer is produced, for example.

In some embodiments, it may be desirable to use a releasing substrate that has a structured surface, such as a microstructured surface. The use of a microstructured releasing substrate may be particularly suitable in conjunction with substantially continuous frangible layers, because the structured surface may aid in the fracture of the frangible layer into an at least partially discontinuous particulate layer. Upon application of pressure to the releasing surface/modifying layer/adhesive layer construction, the pressure will be uneven due to the irregular surface of the structured surface. The uneven pressure may cause breaks in the substantially continuous layer, leaving portions of the layer on the tops of the structures and therefore more easily removed by the adhesive layer.

Figure 3:
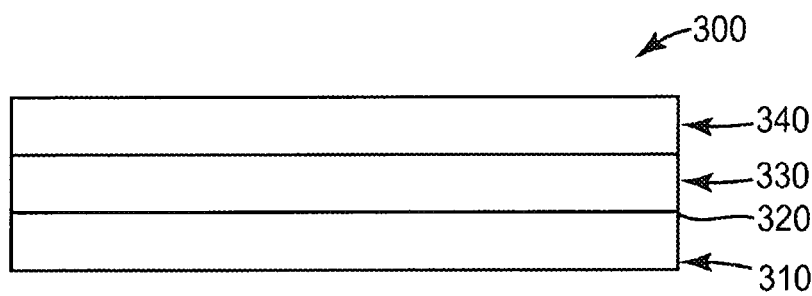
FIG. 3 is a side view of an exemplary embodiment of this disclosure.

An exemplary embodiment of a releasing substrate with either a discontinuous particulate layer or a continuous frangible layer disposed on it to which an adhesive layer has been contacted is shown in FIG. 3. FIG. 3 shows a side view of construction 300 comprising releasing substrate 310, modifying layer 320 disposed on the releasing substrate 110 (not visible in this view), adhesive layer 330, and optional substrate layer 340. Modifying layer 320 comprises either a discontinuous particulate layer or a continuous frangible layer. Optional substrate layer 340 can be, for example, a tape backing, a film, etc.

Figure 4:
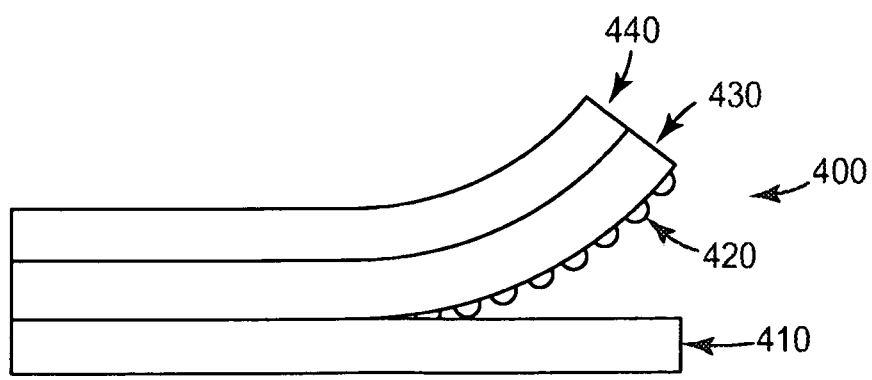
FIG. 4 is a side view of an exemplary embodiment of this disclosure.

An exemplary embodiment of the surface modified adhesive layer is shown in FIG. 4. FIG. 4 shows a side view of the construction of FIG. 3 where the adhesive layer has been partially peeled back to produce construction 400. Construction 400 comprises releasing substrate 410 (corresponding to 310 in FIG. 3), adhesive layer 430 (corresponding to 330 in FIG. 3) with discontinuous surface modification layer 420 (corresponding to 320 in FIG. 3) and optional substrate layer 440 (corresponding to 340 in FIG. 3). Surface modification layer 420 comprises a discontinuous particulate layer. Optional substrate layer 440 can be, for example, a tape backing, a film, etc.

Also included in this disclosure are methods for preparing multilayer adhesive articles. Such articles may be prepared by adhering the surface modified adhesive layer to a variety of different substrates. In addition, in some embodiments, multilayer adhesive articles can be prepared directly as the surface modified adhesive layer is prepared by adding another layer between the releasing substrate and the at least partially discontinuous particulate layer. Such techniques are presented in, for example, PCT Publication WO 2009/070643 (Condon et al.). In these embodiments, a non-adhesive continuous layer is formed on the releasing surface of the releasing substrate. This non-adhesive continuous layer may be prepared by lamination of a film to the releasing surface or by applying a coating to the releasing surface. If a coating is applied it may be supplied as a solution, dispersion, or 100% solids composition and may be a curable or a cured composition. The coating may be applied to the release surface using any suitable coating technique such as, for example, knife coating, roll coating, gravure coating, rod coating, curtain coating, and air knife coating. The coating may also be printed by known methods such as screen printing and inkjet printing. Additionally, 100% solids coatings may be applied using, for example, hot melt coating techniques. After application of the coating, the coating may be dried and/or cured if desired. Examples of suitable coatings include, for example, hard coats, antireflective coatings, low surface energy coatings, antiglare coatings, and the like. Typically, the coatings are thin coatings of about 1-25 micrometers or even 1-10 micrometers or even 2-5 micrometers. To the non-adhesive continuous layer on the release surface is applied the at least partially discontinuous particulate layer or substantially continuous frangible layer using the techniques described above. When the adhesive layer is applied to the at least partially discontinuous particulate layer or substantially continuous frangible layer using the techniques described above, the adhesive layer can at least partially penetrate the discontinuous particulate layer and adhere to the non-adhesive continuous layer. When the adhesive layer is removed, not only the particulate layer but also the continuous non-adhesive layer is at least partially adhered to the adhesive layer and removed from the releasing substrate. An advantage of this embodiment is that it permits the preparation of adhesive articles which contain a surface-modified adhesive layer, without having to remove the surface-modified adhesive layer from the releasing surface and re-adhering it to a substrate. In this embodiment, the adhesive article is prepared at the same time as the surface-modified adhesive layer is prepared.

Figure 5:
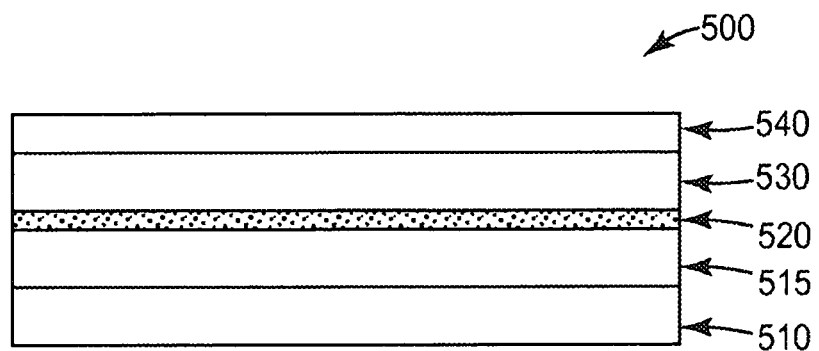
FIG. 5 is a side view of an exemplary embodiment of this disclosure.

An exemplary embodiment of an adhesive article in which the adhesive article is prepared at the same time as the surface-modified adhesive layer is shown in FIG. 5. FIG. 5 shows a side view of adhesive article 500 comprising releasing substrate 510, non-adhesive continuous layer 515 disposed on releasing substrate 510, modifying layer 520 disposed on the non-adhesive continuous layer 515, adhesive layer 530, and optional substrate layer 540. Modifying layer 520 comprises either a discontinuous particulate layer or a continuous frangible layer. Optional substrate layer 540 can be, for example, a tape backing, a film, etc.

Figure 6:
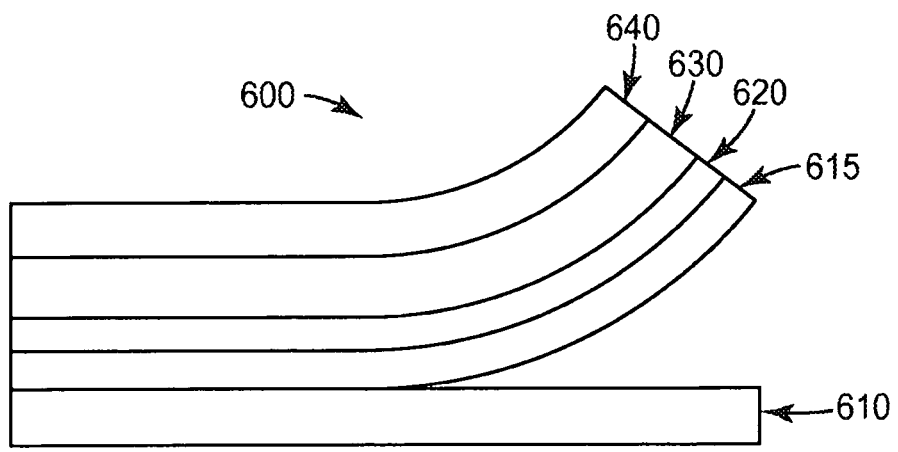
FIG. 6 is a side view of an exemplary embodiment of this disclosure.

An exemplary embodiment of an adhesive article in which the adhesive article is prepared at the same time as the surface-modified adhesive layer is shown in FIG. 6. FIG. 6, shows a side view of the construction of FIG. 5 where the adhesive layer has been partially peeled back to produce construction 600. Construction 600 comprises releasing substrate 610 (corresponding to 510 in FIG. 5), adhesive layer 630 (corresponding to 530 in FIG. 5) with discontinuous surface modification layer 620 (corresponding to 520 in FIG. 5) and non-adhesive continuous layer 615 (corresponding to 515 in FIG. 5) and optional substrate layer 640 (corresponding to 540 in FIG. 5). Surface modification layer 620 comprises a discontinuous particulate layer. Optional substrate layer 640 can be, for example, a tape backing, a film, etc.

The surface-modified adhesive layer of the present disclosure may be used to prepare a variety of adhesive articles. Depending upon the nature of the surface modification, the adhesive layer may have a variety of functional features beyond the ability to bond to a substrate. For example, if the surface-modified adhesive layer contains conductive particles the adhesive surface may be a conductive layer or an anti-static layer. Alternatively, if the surface-modified adhesive layer contains high refractive index particles, the optical properties of the adhesive layer can be modified.

Typically, adhesive articles comprise at least 3 layers: substrate layer-1/adhesive layer/substrate layer-2. The articles may also include additional layers. In the present disclosure, the adhesive layer is a surface-modified adhesive layer wherein the surface modification is on the adhesive surface adhered to substrate layer-2.

For ease of handling, typically the adhesive layer is adhered to substrate layer-1, prior to contacting the releasing surface with a modifying layer on it. Substrate layer-1 may be a film, substrate or release liner. The choice of film, substrate or release liner may depend upon the desired application for the surface-modified adhesive layer. Examples of suitable films include sheeting products (e.g., decorative, reflective, and graphical), label stock, tape backings (e.g., polymeric films, metal films, paper, creped paper, foams, and the like), and optical films. Suitable substrates can contain polymeric materials, glass materials, ceramic materials, metal-containing materials (e.g., metals or metal oxides), or a combination thereof. The substrate can include multiple layers of material such as a support layer, a primer layer, a hard coat layer, a decorative design, and the like. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

Upon removal of the surface-modified adhesive layer from the releasing surface, the surface-modified adhesive layer may be applied to a variety of substrate layer-2 surfaces to form articles. Substrate layer-2 may be a film, substrate or release liner as described above for substrate layer-1.

In certain embodiments, substrate layer-2 comprises an adhesive layer. This adhesive layer (called adhesive layer-2) may be the same adhesive as the adhesive layer or it may be different. Additionally, adhesive layer-2 may be surface modified or non-surface-modified. In one particular embodiment of this disclosure, a conductive layer is generated by producing a grid of conductive particles within an adhesive layer. In this embodiment, 2 surface-modified adhesive layers are prepared in which the at least partially discontinuous particulate layer on the surface of each adhesive layer comprises parallel or substantially parallel lines of conductive particles. Lamination together of the surface-modified adhesive surfaces of the 2 adhesive layers such that the lines of conductive particles form an angle relative to each other of about 1-90°, typically about 45-90°, a conductive grid is thus formed. The adhesive layers may be the same or different, typically they are the same. In another embodiment, the adhesive article comprises a layer of conductive or antistatic particles sandwiched between two layers of adhesive. These embodiments may be prepared by laminating adhesive layer-2 to the surface modified adhesive layer. Adhesive layer-2 may or may not be a surface modified adhesive layer. In some of these embodiments, the adhesive layers are the same.

In some embodiments, the surface-modified adhesive layer may be used to make optical articles or optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, screens or displays, touch panels, cathode ray tubes, polarizers, reflectors, and the like.

Any suitable optical film can be used in the articles. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Exemplary optical films include, but are not limited to, visible mirror films, color mirror films, solar reflective films, infrared reflective films, ultraviolet reflective films, brightness enhancement films, reflective polarizer films such as dual brightness enhancement films, absorptive polarizer films, optically clear films, tinted films, and antireflective films.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.); and U.S. Pat. No. 5,360,659 (Arends et al.).

Substrates in optical articles or optical elements can have a variety of functions such as, for example, providing flexibility, rigidity, strength or support, reflectivity, antireflectivity, polarization, or transmissivity (e.g., selective with respect to different wavelengths). That is, the substrate can be flexible or rigid; reflective or non-reflective; visibly clear; colored but transmissive, or opaque (e.g., not transmissive); and polarizing or non-polarizing.

Exemplary substrates include, but are not limited to, the outer surface of an electronic display such as liquid crystal display or a cathode ray tube, the outer surface of a window or glazing, the outer surface of an optical component such as a reflector, polarizer, diffraction grating, mirror, touch panel, or lens, another film such as a decorative film or another optical film, or the like.

Representative examples of polymeric substrates include those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

| Table of Abbreviations | |
|---|---|
| Abbreviation or Trade Designation | Description |
| Monomer-1 | A mixture of acrylate monomers (2-octyldecyl acrylate and 2-hexyldodecyl acrylate in a weight ratio of 1:1), commercially available as NK ester ISA, from Osaka Organic Chemical Industry, LTD. |

-continued

Table of Abbreviations

| Abbreviation or Trade Designation | Description |
| --- | --- |
| Monomer-2 | Stearyl acrylate, commercially available as NK ester stearyl acrylate, from Osaka Organic Chemical Industry, LTD. |
| Monomer-3 | An acrylate ester having an ultraviolet active group derived from benzophenone, commercially available as EBECRYL P36 from DAICEL-UCB Company, LTD. |
| Initiator-1 | Initiator dimethyl 2,2'-azobis(2-methylpropionate), commercially available as V-601 from Wako Chemicals USA, Inc. |
| ATO-1 | Antimony tin oxide nanoparticle dispersion, 19.1 wt % solids in water, commercially available from Keeling & Walker Ltd under the trade designation "CPM10C". |
| VO-1 | Colloidal vanadium oxide dispersion, 1 wt % in water, prepared according to U.S. Pat. No. 5,427,835 column 21. |
| Wetting Agent-1 | Ethoxylated $C_{12}$-$C_{15}$ alcohol wetting agent, used as a 10 wt % solution in water commercially available from Tomah Products, Inc. as "TOMADOL 25-9". |
| CN-1 | Carbon nanotube dispersion, 1 wt % solids in water, commercially available from Nano Vision Tech & Applied Carbon Nano Technology Co., Pohang, Korea. |
| TO-1 | $TiO_2$ nanoparticle dispersion, 16.2 wt % solids in water, commercially available from SoKang Nano, Beijing, China. |
| ZO-1 | $ZrO_2$ nanoparticles of about 7-13 nanometer size prepared as in U.S. Pat. No. 7,241,437 Example 5. |
| U-PET Film | Unprimed polyester side of P-PET film of polyethylene terephthalate having a thickness of 50 micrometers (2 mils) or 125 micrometers (5 mils). |
| P-PET Film | A primed polyester film of polyethylene terephthalate having a thickness of 50 micrometers (2 mils) or 125 micrometers (5 mils) commercially available from Teijin DuPont as "MELINEX 618" film. |
| Adhesive-1 | Laminating adhesive of 25 micrometers (1 mil) thickness commercially available from 3M Company, St. Paul, MN as "3M Optically Clear Adhesive 8171". |
| Adhesive-2 | Laminating adhesive of 50 micrometers (2 mil) thickness commercially available from 3M Company, St. Paul, MN as "3M Optically Clear Adhesive 8142". |
| Glass Substrate | 1.65 millimeter thick window or float glass plate. |
| ITO-1 | Indium Tin Oxide (ITO) dispersion, 40 wt % solids in IPA, commercially available from Evonik Degussa as "VP ADNANO ITO IR5 DIPA". |
| ITO-2 | Indium Tin Oxide (ITO) dispersion, 40 wt % solids in MEK, commercially available from Evonik Degussa as "VP ADNANO ITO TC8 DMEK". |
| ITO-3 | Indium Tin Oxide (ITO) dispersion, 20 wt % solids in water, commercially available from Evonik Degussa as "VP ADNANO ITO TC8 DW". |
| ATO-2 | Antimony Tin Oxide (ATO) dispersion, 50 wt % solids in water, commercially available from Alfa Aesar as "NANOTEK S1200W". |
| ATO-3 | Antimony Tin Oxide (ATO) sol, 30 wt % solids in IPA, commercially available from Advanced Nano Products Co. Ltd. |
| ATO-4 | Antimony Tin Oxide (ATO) sol, 20 wt % solids in water, commercially available from Advanced Nano Products Co. Ltd. |
| CN-2 | Carbon Nanotube Solution, less than 1 wt % solids in water, commercially available from Brewer Science as "B96000". |
| Liner-1 | Prepared as described in Synthesis Example SE-1 below. |
| Liner-2 | Silicone release liner with easy release commercially available as CLEARSIL T10 from CP Films |
| Liner-3 | Fluorochemical coated PET with a thickness of 50 micrometers (2 mil) commercially available as "SCOTCHPAK 1022" from 3M Company, St. Paul, MN. |
| Liner-4 | Prepared as described in Synthesis Example SE-2 below. |
| IPA | Isopropanol |
| SF-1 | Structured Film-1, 62 micrometer thick film, commercially available as "VIKUITI TBEF-2-62i (90/24)" from 3M Company, St. Paul, MN. |
| MEK | Methyl ethyl ketone |
| Adhesive-3 | Laminating adhesive of 50 micrometers (2 mil) thickness commercially available from 3M Company, St. Paul, MN as "3M Optically Clear Adhesive 8172". |
| Adhesive-4 | Laminating adhesive of 75 micrometers (3 mil) thickness commercially available from 3M Company, St. Paul, MN as "3M Optically Clear Adhesive 8187". |
| Adhesive-5 | Adhesive coated on metalized polyester backing with a fluorochemical release liner commercially available from 3M Company, St. Paul, MN as "3M Very Low Outgassing Linered Polyester Tape 6690". |

Test Methods

% Transmission and Haze:

The optical properties of % Transmission or % Transmission and Haze were measured using a HAZE-GARD Plus hazemeter from BYK-Gardner USA.

Sheet Resistance:

Sheet resistance (also called surface resistivity) was measured using a PROSTAT PRS-801 resistance system from Prostat Corp. equipped with a PRF-911 concentric ring fixture. Surface resistivities in ohms were converted to ohms/square (Ω/square) by multiplying the measured values by 10 according to the documentation supplied with the instrument. Sheet resistance measurements were made at ambient laboratory humidity of 30-40% relative humidity.

Static Charge Decay:

Static charge decay time was measured on laminates using an Electro-Tech Systems, Inc. Model 406C static decay meter by charging the sample to 5 kV (with either + polarity or – polarity) and measuring the time required for the static charge to decay to 10% of its initial value. Film samples approximately 13 centimeters (5 inches) on a side were cut and mounted between the meter electrodes using magnets. Static charge decay measurements were made at ambient laboratory humidity of 30-40% relative humidity.

180° Peel Adhesion:

Laminates of release liner/modified adhesive coatings/PET film were cut into 1.27 centimeter (0.5 inch) by about 13 centimeter (5 inch) strips. The release liner was removed and the strip adhered to a clean, solvent washed glass plate or P-PET film using a 2 kilogram roller passed 3 times over the strip. The bonded assembly was aged at room temperature (25° C., 50% relative humidity) or 70° C. (in a forced air oven) for 3 days. Samples aged at 70° C. were allowed to cool to room temperature prior to peel testing. The samples were tested for 180° peel adhesion using an IMASS slip/peel tester (Model SP-2000, commercially available from Instrumentors Inc., Strongsville, Ohio) at a rate of 30.5 centimeters/minute (12 inches/minute) over a 10 second data collection time. Two samples were tested; the reported adhesion value is an average of the two samples. The peel force was measured in ounces per half inch width and converted to Newtons per decimeter (N/dm).

SYNTHESIS EXAMPLES

Synthesis Example SE-1

Preparation of Liner-1

Step 1: Preparation of Release Material Precursor:

In a 500 ml brown glass bottle, 100 parts of Monomer-1, 100 parts of Monomer-2 and 0.4 parts of Monomer-3 were added to a mixed solvent mixture containing ethyl acetate and n-heptanes in a weight ratio of 50:50 to prepare a reaction solution having a solid content of 60% by weight. To this mixture, 0.3 parts of Initiator-1 was added, the contents of the bottle were purged with a nitrogen gas for 10 minutes and sealed with a cap. The sealed bottle was placed in a rotary constant-temperature bath maintained at 60° C. for 24 hours. The material thus produced was used as a release material precursor.

Step 2: Preparation of Release Liner-1:

The acrylic release material precursor prepared in Step 1 above was diluted with a 50:50 blend of toluene and n-heptanes to prepare a diluted solution at 2.0% solids by weight. A U-PET film was coated with the diluted solution, using a #3 Mayer bar and dried to remove the solvents to obtain an acrylic release precursor having a thickness of about 0.1 micrometers on a PET film. Using a high-pressure mercury lamp (H type) manufactured by Fusion Systems Corporation, the acrylic release material precursor was irradiated with ultraviolet (UV) radiation with an energy density of 120 mJ/cm$^2$ under nitrogen to give Release Liner-1.

Synthesis Example SE-2

Preparation of Liner-4

Step 1: Preparation of Release Material Precursor:

Same as Step 1 for Synthesis Example S1 above.

Step 2: Preparation of Release Liner-4:

The acrylic release material precursor prepared in Step 1 above, was diluted with a 50:50 blend of toluene and n-heptanes to prepare a diluted solution at 1.0% solids by weight. A sample of SF-1 film was coated with the diluted solution, on a pilot coating line using a direct gravure coating cylinder with 204 lines/inch at a coating speed of 9.1 meters per minute (30 feet per minute) followed by drying in a 6.1 meter (20 foot) oven at 104° C. and cured by a high-pressure mercury lamp (H type) manufactured by Fusion Systems Corporation. The acrylic release material precursor was irradiated with ultraviolet (UV) radiation with an energy density of 40 mJ/cm$^2$ under nitrogen to give Release Liner-4.

Vapor Coating Procedure:

Samples of releasing substrates were vapor coated using E-beam evaporation of metals. The sample pieces of releasing substrate were placed in a vacuum chamber and attached (with tape) to the bottom of 5 38 centimeter (15 inch) diameter plates that are rotated during deposition to give a uniform coating thickness over the entire surface. The metal sample was placed into one or more of 4 crucibles approximately 5 centimeters (2 inches) below the rotating plates. The chamber was evacuated using a rough pump and then an oil diffusion pump to achieve a vacuum of $10^{-5}$–$10^{-7}$ torr. The thickness of metal deposited was controlled by an Inficon 106000 crystal monitor system. Upon achieving a vacuum of $10^{-5}$ torr, the IC6000 program turns on the e-beam heater and turns it off once the desired thickness is reached. The chamber was vented and the samples removed.

Sputter Coating Procedure:

Samples of releasing substrates were sputter coated using a sputter coater with a central vacuum chamber containing a 5 centimeter (2 inch) diameter chilled coating drum and 2 side chambers containing a winder/unwinder to transport the web over the coating drum. Three 13 centimeter by 38 centimeter (5 inch by 15 inch) DC magnetron sputtering sources were positioned around the coating drum. The desired coating sample was placed in the sputtering sources, and the releasing substrate film was loaded in the side chambers. The system was closed and evacuated using a rough pump and then an oil diffusion pump to achieve a vacuum of $10^{-5}$-$10^{-7}$ torr. The thickness of metal deposited was controlled by a Delcom Conductance monitor and an Ocean Optics % Transmission monitor. Upon achieving a vacuum of $10^{-5}$ torr, argon gas was metered in to achieve a sputtering pressure of about $10^{-3}$ torr. The web drive was started and the power supply to the sputtering sources was turned on. Once the desired amount of releasing substrate film was coated, the sputtering sources were turned off, the chamber was vented and the samples removed.

Examples 1-13

A series of surface modified adhesives were prepared and tested using the multistep procedure described below.

Step-1: Preparation of Nanoparticle Layer:

A series of nanoparticle layers were prepared on U-PET by preparing the nanoparticle mixtures described in Table 1, coating the nanoparticle mixtures on the U-PET film using the Mayer rod number shown in Table 1, and allowing the coating to dry at room temperature.

Step 2: Preparation of Surface Modified Adhesive:

Adhesive films were laminated to the nanoparticle layer on U-PET film prepared in Step 1 above using a General Binding Corporation CATENA 35 laminator with temperature set at 0° C. (32° F.), the gap set at heavy gauge, and the speed setting of 1 millimeter. The adhesive films Adhesive-1 are designated A Examples and the adhesive films Adhesive-2 are designated B Examples. One liner was removed from the adhesive films and the adhesive film was positioned liner side against the top roll and the nanoparticle layer on U-PET film was placed nanoparticle layer up on the bottom roll.

Step 3 Preparation and Testing of Adhesive Laminates:

Samples of the laminate constructions prepared in Step 2 above of release liner/surface modified adhesive/U-PET film, were tested for % Transmission and Charge Decay using the test methods described above. The results are shown in Table 2. Additional laminates were prepared by removing the release liner from the laminates prepared in Step 2 above and laminating the adhesive film to P-PET film or a Glass Substrate using the same lamination conditions as in Step 2. Samples of these laminate constructions prepared in Step 2 above of P-PET film/surface modified adhesive/U-PET film or Glass/surface modified adhesive/U-PET film, were tested for % Transmission and Charge Decay using the test methods described above. The results are shown in Table 3. From these laminates, the initial U-PET film was stripped off to expose the surface modified adhesive surface. Confirmation of the transfer of the nanoparticle layer to the adhesive was achieved by the observations that the removed U-PET films did not contain the nanoparticle layer and the adhesive layer was observed to contain the color of the nanoparticle layer. Additionally the surface modified adhesive surface was checked for tackiness, the result is reported in Table 3.

TABLE 1

| Example | Nanoparticle Mixture | Mayer Rod (#) |
|---|---|---|
| 1 | 4 grams of VO-1 solution, 8 grams of water, and 0.12 gram of Wetting Agent-1 | 4 |
| 2 | 1 gram of ATO-1 solution, 6.5 grams of water, and 0.12 gram of Wetting Agent-1 | 3 |
| 3 | CN-1 was diluted to 0.4 wt % in water | 3 |
| 4 | 1 gram of TO-1 solution, 6.5 grams of water, and 0.18 gram of Wetting Agent-1 | 3 |

TABLE 2

| Example | Adhesive | Laminate Example from Step 2 | % Transmission | Charge Decay (seconds) |
|---|---|---|---|---|
| 5 | 1 | 1A | 92.4 | 0.01 |
| 6 | 1 | 2A | 92.4 | 0.01 |
| 7 | 1 | 3A | 93.1 | 0.04 |
| 8 | 1 | 4A | 89.7 | DNC |

DNC = Did Not Charge

TABLE 3

| Example | Laminate Description Substrate/adhesive/substrate | % Transmission | Sheet Resistance (Ω/square) | Charge Decay (seconds) | Tackiness (Yes/No) |
|---|---|---|---|---|---|
| 9 | Glass/1A/U-PET | 88.6 | $1.1 \times 10^8$ | 0.01 | Yes |
| 10 | Glass/1A/U-PET | 88.1 | $1.2 \times 10^8$ | 0.01 | Yes |
| 11 | Glass/2A/U-PET | 87.1 | $2.7 \times 10^7$ | 0.00 | Yes |
| 12 | P-PET/2A/U-PET | 86.3 | $3 \times 10^7$ | 0.00 | Yes |
| 13 | P-PET/3A/U-PET | 90.2 | $1.8 \times 10^{11}$ | 0.04 | Yes |

Examples 14-15

A series of surface modified adhesives were prepared and tested using the multistep procedure described below.

Step-1: Preparation of Nanoparticle Layer:

A series of nanoparticle layers were prepared on U-PET by preparing the nanoparticle mixtures described in Table 4, coating the nanoparticle mixtures on the U-PET film using the Mayer rod number shown in Table 4, and allowing the coating to dry at room temperature.

Step 2: Preparation of Surface Modified Adhesive:

Adhesive films were laminated to the nanoparticle layer on U-PET film prepared in Step 1 above using a General Binding Corporation CATENA 35 laminator with temperature set at 0° C. (32° F.), the gap set at heavy gauge, and the speed setting of 1 millimeter. One liner was removed from the Adhesive-1 film and the adhesive film was positioned liner side against the top roll and the nanoparticle layer on U-PET film was placed nanoparticle layer up on the bottom roll.

Step 3 Preparation and Testing of Adhesive Laminates:

From the laminates prepared in Step-2 above, the U-PET film was stripped off to expose the surface modified adhesive surface. Confirmation of the transfer to the nanoparticle layer to the adhesive was achieved by the observations that the removed U-PET films did not contain the nanoparticle layer and the adhesive layer was observed to contain the color of the nanoparticle layer. Additionally the surface modified adhesive surface was checked to confirm that the adhesive surface remained tacky.

TABLE 4

| Example | Nanoparticle Mixture | Mayer Rod (#) |
|---|---|---|
| 14 | 1 gram of ZO-1 solution, 9 grams of water, and 0.20 gram of Wetting Agent-1 | 8 |
| 15 | 1 gram of TO-1 solution, 3 grams of water, and 0.10 gram of Wetting Agent-1 | 8 |

Examples 16-42 and Comparative Examples C1-C2

A series of surface modified adhesives were prepared and tested using the multistep procedure described below.

Step-1: Preparation of Nanoparticle Layer:

A series of nanoparticle layer samples (Samples S1-S30) were prepared on Liner-1 by preparing the nanoparticle mixtures with the wt % of particles and other additives (WA-1 refers to Wetting Agent-1) described in Table 5, coating the nanoparticle mixtures on Liner-1 using the Mayer rod number shown in Table 5, and drying the coatings by placing them in a 100° C. forced air oven for 3 minutes. The Liner-1 with nanoparticle layer samples were tested for Sheet Resistance, Haze and % Transmission using the test methods described above. The results are shown in Table 5.

Sample S31 is just Liner-1 with no nanoparticle layer coated on it.

TABLE 5

| Sample | Particle Description | Particle Wt % | Additives (wt %) | Mayer Rod (#) | Sheet Resistance (Ω/square) | Haze (%) | Transmission (%) |
|---|---|---|---|---|---|---|---|
| S1 | ITO-1 | 44 | None | 3 | $9.80 \times 10^6$ | 5.12 | 89.2 |
| S2 | ITO-1 | 22 | None | 3 | $2.53 \times 10^8$ | 10.1 | 90.2 |
| S3 | ITO-1 | 11 | None | 3 | $1.51 \times 10^{11}$ | NM | NM |
| S4 | ITO-2 | 45 | None | 3 | $7.73 \times 10^6$ | 2.99 | 89.9 |
| S5 | ITO-2 | 22.5 | None | 3 | $3.53 \times 10^7$ | 3.16 | 90.7 |
| S6 | ITO-2 | 11.25 | None | 3 | $2.10 \times 10^8$ | 5.52 | 89.1 |
| S7 | ITO-3 | 20 | IPA (2); WA-1 (0.3) | 3 | $9.13 \times 10^6$ | 2.53 | 91.8 |
| S8 | ITO-3 | 10 | IPA (2); WA-1 (0.3) | 3 | $7.00 \times 10^7$ | 2.98 | 91.3 |
| S9 | ITO-3 | 5 | IPA (2); WA-1 (0.3) | 3 | $5.43 \times 10^9$ | 3.81 | 94.6 |
| S10 | ITO-3 | 2.5 | IPA (2); WA-1 (0.3) | 3 | $1.28 \times 10^{13}$ | 6.51 | 93.6 |
| S11 | ATO-2 | 20 | IPA (2); WA-1 (0.3) | 3 | $1.67 \times 10^7$ | 5.51 | 91.8 |
| S12 | ATO-2 | 10 | IPA (2); WA-1 (0.3) | 3 | $6.33 \times 10^7$ | 6.62 | 91.3 |
| S13 | ATO-2 | 5 | IPA (2); WA-1 (0.3) | 3 | $5.43 \times 10^9$ | 6.82 | 94.6 |
| S14 | ATO-2 | 2.5 | IPA (2); WA-1 (0.3) | 3 | $1.28 \times 10^{13}$ | 8.46 | 93.6 |
| S15 | ATO-3 | 30 | None | 3 | $9.97 \times 10^6$ | 2.46 | 89 |
| S16 | ATO-3 | 15 | None | 3 | $4.13 \times 10^7$ | 3.02 | 89.1 |
| S17 | ATO-3 | 7.5 | None | 3 | $1.60 \times 10^8$ | 4.31 | 89.7 |
| S18 | ATO-4 | 20 | IPA (2); WA-1 (0.3) | 3 | $1.27 \times 10^7$ | 2.01 | 92.1 |
| S19 | ATO-4 | 10 | IPA (2); WA-1 (0.3) | 3 | $2.00 \times 10^7$ | 3.45 | 89.7 |
| S20 | ATO-4 | 5 | IPA (2); WA-1 (0.3) | 3 | $1.80 \times 10^8$ | 2.95 | 90.2 |
| S21 | ATO-4 | 2.5 | IPA (2); WA-1 (0.3) | 3 | $2.33 \times 10^9$ | 3.69 | 91.1 |
| S22 | ATO-4 | 20 | WA-1 (0.4) | 3 | $2.43 \times 10^7$ | 2.97 | 90.2 |
| S23 | CN-2 | 1 | IPA (2); WA-1 (0.3) | 3 | $5.00 \times 10^{11}$ | 3.23 | 91.8 |
| S24 | CN-2 | 1 | IPA (2); WA-1 (0.3) | 8 | $3.47 \times 10^9$ | 5.77 | 91.3 |
| S25 | CN-2 | 1 | IPA (2); WA-1 (0.3) | 18 | $8.50 \times 10^8$ | 3.54 | 91.6 |
| S26 | CN-2 | 1 | IPA (2); WA-1 (0.3) | 34 | $7.13 \times 10^7$ | 4.24 | 91.8 |
| S27 | CN-2 | 1 | WA-1 (0.5) | 3 | $8.77 \times 10^{10}$ | 3.62 | 91.7 |
| S28 | VO-1 | 0.05 | IPA (2); WA-1 (0.3) | 3 | $9.73 \times 10^8$ | 2.79 | 91.6 |
| S29 | VO-1 | 0.05 | IPA (2); WA-1 (0.3) | 9 | $3.67 \times 10^7$ | 4.63 | 91.3 |
| S30 | VO-1 | 0.05 | WA-1 (0.4) | 3 | $8.30 \times 10^9$ | 3.02 | 90.8 |
| S31 | None | 0 | None | — | $>1 \times 10^{13}$ | 2.17 | 91.6 |

NM = Not Measured

Step 2: Preparation of Surface Modified Adhesive:

Adhesive films were laminated to the selected samples of the nanoparticle layer on Liner-1 film prepared in Step 1 above using a 2.2 kilogram (5 pound) rubber roller. One liner was removed from the Adhesive-3, the exposed adhesive layer was laminated to P-PET, the other liner was removed from the adhesive film and the adhesive film was positioned with the P-PET side against the rubber roller and the nanoparticle layer on Liner-1 film was placed nanoparticle layer up on the benchtop surface.

Step 3 Preparation and Testing of Adhesive Laminates:

Samples of the laminates prepared in Step-2 above were tested for 180° Peel Adhesion (from glass or PET substrates after RT or 70° C. aging) by removing Liner-1 and testing using the test method described above. The results are shown in Table 6. Other samples of the laminates prepared in Step-2 above, were tested for % Transmission, Haze and Charge Decay using the test methods described above. The results are shown in Table 7.

TABLE 6

| Example | Nanoparticle Layer Sample Number | 180° Peel from Glass RT aged (N/dm) | 180° Peel from Glass 70° C. aged (N/dm) | 180° Peel from PET RT aged (N/dm) | 180° Peel from PET 70° C. aged (N/dm) |
| --- | --- | --- | --- | --- | --- |
| 16 | S17 | 35.2 | 50.5 | 34.4 | 40.5 |
| 17 | S2 | 21.7 | 50.9 | 22.3 | 38.9 |
| 18 | S6 | 21.0 | 41.8 | 20.1 | 86.2 |
| 19 | S13 | 36.5 | 49.9 | 33.9 | 38.9 |
| 20 | S9 | 27.4 | 42.5 | 32.4 | 37.9 |
| 21 | S28 | 53.9 | 68.5 | 49.0 | 75.8 |
| 22 | S29 | 48.4 | 97.4 | 41.3 | 84.7 |
| 23 | S25 | 33.5 | 61.3 | 34.7 | 46.0 |
| 24 | S26 | 29.6 | 61.2 | 39.3 | 44.4 |
| 25 | S21 | 46.5 | 49.7 | 41.5 | 45.1 |
| C1 | S31 | 69.2 | 73.8 | 54.7 | 51.3 |

TABLE 7

| Example | Nanoparticle Layer Sample Number | Charge Decay + polarity (seconds) | Charge Decay − polarity (seconds) | Haze (%) | % Transmission |
| --- | --- | --- | --- | --- | --- |
| 16 | S17 | 0.00 | 0.01 | 92.4 | 3.6 |
| 17 | S2 | 0.02 | 0.07 | 89.2 | 4.8 |
| 18 | S6 | 0.00 | 0.00 | 91.2 | 3.3 |
| 19 | S13 | 0.01 | 0.01 | 89.3 | 3.6 |
| 20 | S9 | 4.85 | 3.93 | 91.3 | 3.1 |
| 21 | S28 | 0.00 | 0.01 | 89.7 | 2.9 |
| 22 | S29 | 0.00 | 0.00 | 92.7 | 3.4 |
| 23 | S25 | 0.01 | 0.01 | 88.2 | 3.4 |
| 24 | S26 | 0.01 | 0.00 | 88.8 | 2.8 |
| 25 | S21 | 0.02 | 0.01 | 92.6 | 4.3 |
| C1 | S1 | DNC | DNC | 89.7 | 2.4 |

DNC = Did Not Charge

Step 4 Preparation and Testing of Modified Adhesive Transfer Tapes:

Samples of the laminates prepared in Step-2 above were used to generate transfer tapes with a conductive layer in the middle. The transfer tapes were prepared by removing Liner-1 from the laminates prepared in Step 2 above and laminating the adhesive layer to the exposed adhesive surface of another sample of Adhesive-3 from which one of the liners has been removed, using the same lamination conditions as in Step 2 to give laminates of liner/adhesive/nanoparticle layer/adhesive/P-PET. Samples of these laminates were tested for 180° Peel Adhesion (from glass or PET substrates after RT or 70° C. aging) by removing the liner and testing using the test method described above. The results are shown in Table 8. Other samples of these laminates were tested for % Transmission, Haze and Charge Decay using the test methods described above. The results are shown in Table 9.

TABLE 8

| Example | Nanoparticle Layer Sample Number | 180° Peel from Glass RT aged (N/dm) | 180° Peel from Glass 70° C. aged (N/dm) | 180° Peel from PET RT aged (N/dm) | 180° Peel from PET 70° C. aged (N/dm) |
| --- | --- | --- | --- | --- | --- |
| 26 | S1 | 70.2 | 84.1 | 56.1 | 53.5 |
| 27 | S2 | 71.3 | 82.8 | 58.6 | 57.1 |
| 28 | S4 | 1.55 | 82.2 | 57.8 | 59.3 |
| 29 | S5 | 72.4 | 83.4 | 62.5 | 58.3 |
| 30 | S6 | 72.2 | 85.6 | 61.5 | 56.4 |
| 31 | S9 | 77.7 | NM | 62.5 | 56.3 |
| 32 | S28 | 75.0 | 71.2 | 59.6 | 67.5 |
| 33 | S29 | 71.0 | 85.6 | 61.7 | 73.6 |
| 34 | S15 | 73.5 | 79.2 | 58.4 | 52.9 |
| 35 | S16 | 62.0 | 69.2 | 54.3 | 59.1 |
| 36 | S17 | 76.2 | 79.4 | 62.5 | 58.3 |
| 37 | S13 | 72.2 | 78.9 | 57.0 | 57.0 |
| 38 | S18 | 57.3 | 65.2 | 56.4 | 57.5 |
| 39 | S21 | 40.3 | 39.1 | 30.6 | 27.9 |
| 40 | S23 | 74.7 | 79.2 | 61.4 | 57.0 |
| 41 | S25 | 74.3 | 81.0 | 63.7 | 61.1 |
| 42 | S26 | 75.5 | 81.0 | 66.0 | 63.8 |
| C2 | S1 | 73.8 | 78.4 | 60.4 | 62.1 |

NM = Not Measured

TABLE 9

| Example | Nanoparticle Layer Sample Number | Charge Decay + polarity (seconds) | Charge Decay − polarity (seconds) | Haze (%) | % Transmission |
| --- | --- | --- | --- | --- | --- |
| 26 | S1 | 0.01 | 0.00 | 84.93 | 36.40 |
| 27 | S2 | 0.01 | 0.01 | 86.17 | 35.70 |
| 28 | S4 | 0.00 | 0.00 | 85.23 | 35.00 |
| 29 | S5 | 0.01 | 0.01 | 86.00 | 34.50 |
| 30 | S6 | 0.01 | 0.01 | 86.37 | 34.13 |
| 31 | S9 | 4.85 | 3.93 | 85.97 | 35.07 |
| 32 | S28 | 0.19 | 0.16 | 86.53 | 34.17 |
| 33 | S29 | 0.01 | 0.00 | 86.60 | 34.30 |
| 34 | S15 | 0.01 | 0.01 | 84.60 | 34.50 |
| 35 | S16 | 0.01 | 0.01 | 84.70 | 33.60 |
| 36 | S17 | 0.00 | 0.00 | 85.23 | 34.37 |
| 37 | S13 | 0.01 | 0.01 | 85.73 | 35.07 |
| 38 | S18 | 0.00 | 0.00 | 85.27 | 34.17 |
| 39 | S21 | 0.00 | 0.01 | 85.37 | 35.13 |
| 40 | S23 | DNC | >50 | 86.97 | 34.50 |
| 41 | S25 | 0.01 | 0.01 | 86.43 | 34.40 |
| 42 | S26 | 0.00 | 0.00 | 84.43 | 34.77 |
| C2 | S1 | DNC | DNC | 87 | 34.5 |

DNC = Did Not Charge

Comparative Examples C3-C32

A series of nanoparticle layer samples (Samples S1-S30) as described in Table 5 above were coated on Liner-2, using the methods and materials described above, and drying the coatings by placing them in a 100° C. forced air oven for 3 minutes. The coatings did not wet the liner surface to give an acceptable nanoparticle layer so no additional preparation or testing was done with these samples.

Examples 43-45

A series of surface modified adhesives were prepared and tested using the multistep procedure described below.

Step-1: Preparation of Nanoparticle Grid:

Copper grids with the pattern of a hexagonal honeycomb (with 25.4 micrometer (1 mil) wide lines) were prepared on Liner-3 by impressing the raised pattern of a hexagonal honeycomb on Liner-3, using a FLEXIPROOF 100/UV 30-60 flexographic printing machine, onto samples of Liner-3 (25 centimeters×30 centimeters). Liner-3 was vapor coated with copper to the desired thickness (Example 43 100 nanometers; Example 44200 nanometers; Example 45300 nanometers). The areas of the copper coatings that had the raised pattern were then selectively masked with UV Curable Ink using an anilox roll coater, and the ink was cured. The copper not masked by the ink coating was removed by etching with a 1% solution of ferric chloride in a water bath. The substrate was washed with water and dried. The ink mask was removed by dipping into a bath of MEK and the resulting substrate containing a copper grid with a hexagonal honeycomb pattern was allowed to air dry.

Step 2: Preparation of Surface Modified Adhesive:

Adhesive films were laminated to the selected samples of the nanoparticle grid on Liner-3 film prepared in Step 1 above using a hand roller. One liner was removed from the Adhesive-4, the exposed adhesive layer was laminated to the nanoparticle grid on Liner-3 film prepared in Step 1 above, the other liner was removed from the adhesive film and the adhesive film was laminated to U-PET to give a Liner-3/copper grid/adhesive/U-PET laminate.

Step 3 Preparation and Testing of Adhesive Laminates:

Liner-3 was removed from the laminates prepared in Step 2 above using a FLEXIPROOF 100/UV 30-60 flexographic printing machine with a peeling speed of either 35 or 55 meters per minute as shown in Table 10. In some instances the laminates were placed in an oven for 10 minutes prior to removal of Liner-3. Upon removal of Liner-3 the samples were tested for Sheet Resistance using the test method described above. The data are presented in Table 10.

TABLE 10

| Example | Copper Thickness (nm) | Oven Temperature if used (° C.) | Peeling Speed (m/minute) | Sheet Resistance (Ω/square) |
|---|---|---|---|---|
| 43-1 | 100 | 100 | 55 | 5.79 |
| 44 | 200 | 100 | 55 | 3.32 |
| 43-2 | 100 | Not used | 35 | 14.8 |
| 45 | 300 | Not used | 35 | 188 |

Examples 46-47

A series of surface modified adhesives were prepared and tested using the multistep procedure described below.

Step-1: Preparation of Sputter Coated Liners:

Metal oxide coated liners with frangible layers of Indium tin oxide of 100 nanometer thickness were prepared on Liner-1 (Example 46) and Liner-4 (Example 47) by sputter coating using the method described above in the Synthesis Examples section. The Sheet Resistance of the coatings on the liners was measured using the test method described above, the data are presented in Table 11.

Step 2: Preparation of Surface Modified Adhesive:

Adhesive films were laminated to the selected samples of the sputter coated liners prepared in Step 1 above using a hand roller. One liner was removed from the Adhesive-5, the exposed adhesive layer was laminated to the sputter coated liner prepared in Step 1 above, to prepare a laminate.

Step 3 Testing of Surface Modified Adhesive:

The laminates prepared in Step 2 above were placed in an 80° C. oven from 30 minutes and then the adhesive layer was peeled away from the sputter coated liner to generate the surface modified adhesive layer. The surface modified adhesive layer samples were tested for Sheet Resistance using the test method described above, the data are presented in Table 11. While the Sheet Resistance was not measured for Example 47, the metal coating on the adhesive layer was observed to be discontinuous because the indium tin oxide had only transferred from the top surfaces of structured Liner-4.

TABLE 11

| Example | Liner | Sheet Resistance, Liner Coating (Ω/square) | Sheet Resistance Adhesive Layer (Ω/square) |
|---|---|---|---|
| 46 | 1 | 63.8 | 2125 |
| 47 | 4 | 69.4 | NM |

NM = Not Measured

Examples 48-53

A series of surface modified adhesives were prepared and tested using the multistep procedure described below.

Step-1: Preparation of Sputter Coated Liners:

Metal coated liners with frangible layers of copper, silver, or aluminum were prepared on Liner-4 by sputter coating or vapor coating to thicknesses of 100 nanometers, using the techniques described above in the Synthesis Examples section. The identity of the coatings on the liners are presented in Table 12.

Step 2: Preparation of Surface Modified Adhesive:

Adhesive films were laminated to the selected samples of the metal coated liners prepared in Step 1 above using a hand roller. One liner was removed from the Adhesive-5, the exposed adhesive layer was laminated to the metal coated liner prepared in Step 1 above, to prepare a laminate.

Step 3 Testing of Surface Modified Adhesive:

The laminates prepared in Step 2 above were placed in an oven at a temperature and for the time shown in Table 12 below. The adhesive layer was peeled away from the metal coated liner to generate the surface modified adhesive layer. The metal coating on the adhesive layer was observed to be discontinuous because the metal had only transferred from the top surfaces of structured Liner-4.

TABLE 12

| Example | Metal | Coating method | Oven temperature for Metal Transfer (° C.) | Time in Oven for Metal Transfer (minutes) |
|---|---|---|---|---|
| 48 | Cu | Sputter | 70 | 10 |
| 49 | Cu | Vapor | 70 | 5 |
| 50 | Ag | Sputter | 78 | 10 |
| 51 | Ag | Vapor | 70 | 5 |
| 52 | Al | Sputter | 80 | 15 |
| 53 | Al | Vapor | 70 | 10 |

What is claimed is:

1. A method of modifying the surface of an adhesive comprising:
providing an adhesive layer, wherein the adhesive layer consists of a pressure sensitive adhesive or a heat activated adhesive;

providing a releasing substrate with an at least partially discontinuous layer on the surface of the substrate;

contacting the adhesive layer to the at least partially discontinuous layer on the surface of the substrate; and removing the adhesive layer from the surface of the substrate, such that the at least partially discontinuous layer at least partially adheres to the surface of the adhesive layer upon removal to form a modified adhesive layer surface, and wherein the modified adhesive layer surface remains a pressure sensitive or heat activated adhesive surface such that the adhesive surface is capable of bonding to a substrate, and wherein the at least partially discontinuous layer is a metal grid or mesh with a thickness of no greater than 500 nanometers.

2. The method of claim 1, wherein the adhesive layer consists of an optically clear adhesive.

3. The method of claim 1, wherein the adhesive layer consists of a pressure sensitive adhesive.

4. The method of claim 1, wherein the releasing substrate comprises a release liner.

* * * * *